United States Patent
Shimizu et al.

(10) Patent No.: US 8,390,698 B2
(45) Date of Patent: Mar. 5, 2013

(54) IMAGE CAPTURING APPARATUS, REPRODUCTION APPARATUS, IMAGE CAPTURING METHOD, AND REPRODUCTION METHOD

(75) Inventors: Kenji Shimizu, Fukuoka (JP); Ryuji Fuchikami, Hiroshima (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/263,376

(22) PCT Filed: Apr. 7, 2010

(86) PCT No.: PCT/JP2010/002528
§ 371 (c)(1),
(2), (4) Date: Oct. 7, 2011

(87) PCT Pub. No.: WO2010/116731
PCT Pub. Date: Oct. 14, 2010

(65) Prior Publication Data
US 2012/0038793 A1    Feb. 16, 2012

(30) Foreign Application Priority Data
Apr. 8, 2009  (JP) ................. 2009-093810

(51) Int. Cl.
*H04N 5/228* (2006.01)
*H04N 5/235* (2006.01)
*H04N 7/18* (2006.01)
*G06K 9/46* (2006.01)
*G06K 9/40* (2006.01)

(52) U.S. Cl. ............... 348/222.1; 348/221.1; 348/208.4; 348/154; 348/155; 348/362; 382/236; 382/232; 382/255; 382/238; 382/254

(58) Field of Classification Search ............... 348/222.1, 348/221.1, 362, 208.99–208.16, 208.14, 348/220.1, 208.1, 208.4, 208.2, 154, 155; 382/236, 232, 238, 239, 254, 255
See application file for complete search history.

(56) References Cited

U.S. PATENT DOCUMENTS
7,301,563 B1    11/2007  Kakinuma et al.
2007/0146538 A1*  6/2007  Kakinuma et al. ............ 348/362
(Continued)

FOREIGN PATENT DOCUMENTS
JP      10-322532      12/1998
JP      2000-50151     2/2000
(Continued)

OTHER PUBLICATIONS

International Search Report issued Jun. 1, 2010 in International (PCT) Application No. PCT/JP2010/002528.
A Reply (First) submitted in International Application No. PCT/JP2010/002528 and its English translation.

*Primary Examiner* — Nhan T Tran
*Assistant Examiner* — Marly Camargo
(74) *Attorney, Agent, or Firm* — Wenderoth, Lind & Ponack, LLP

(57) ABSTRACT

Provided is an image capturing apparatus (100) that can improve coding efficiency, and record a still image with a wide dynamic range and smooth moving images. The apparatus includes: an image capturing unit (110) capturing images by exposure for a first exposure time and a second exposure time longer than the first exposure time to generate a short-time exposure image and a long-time exposure image; a short-time exposure image storage unit (120) storing the short-time exposure image; a long-time exposure image storage unit (130) storing the long-time exposure image; a motion blur adding unit (140) generating a predicted image of the long-time exposure image by adding motion blur to the short-time exposure image; a subtracting unit (150) calculating a difference between the long-time exposure image and the predicted image to generate a difference image; and a coding unit (170) coding the short-time exposure image and the difference image.

17 Claims, 12 Drawing Sheets

U.S. PATENT DOCUMENTS

| | | |
|---|---|---|
| 2007/0159538 A1 | 7/2007 | Kakinuma et al. |
| 2007/0229698 A1* | 10/2007 | Kakinuma et al. ............ 348/362 |
| 2008/0187234 A1 | 8/2008 | Watanabe et al. |
| 2009/0167909 A1* | 7/2009 | Imagawa et al. .............. 348/262 |
| 2010/0214422 A1 | 8/2010 | Iwamura et al. |
| 2010/0296582 A1* | 11/2010 | Shimizu et al. .......... 375/240.16 |
| 2011/0249750 A1* | 10/2011 | Fuchikami et al. ...... 375/240.16 |

FOREIGN PATENT DOCUMENTS

| | | |
|---|---|---|
| JP | 2001-111934 | 4/2001 |
| JP | 2002-101347 | 4/2002 |
| JP | 2007-60449 | 3/2007 |
| WO | 2007/032156 | 3/2007 |
| WO | 2007/063819 | 6/2007 |

* cited by examiner

IMAGE CAPTURING APPARATUS, REPRODUCTION APPARATUS, IMAGE CAPTURING METHOD, AND REPRODUCTION METHOD

TECHNICAL FIELD

The present invention relates to an image capturing apparatus that captures, codes, and records video, and a reproduction apparatus that reproduces a recorded image, and in particular to an image capturing apparatus that captures images having different exposure amounts to differentiate between moving images and still images for reproduction, and to a reproduction apparatus that reproduces the moving images and still images.

BACKGROUND ART

In recent years, the techniques for obtaining still images from moving images at any given point in time when the moving images captured by video cameras are being reproduced to reproduce the still images have been developing. For example, there are cases where still images at a predetermined point in time are reproduced according to an instruction by the user and others, during the time when moving images of golf swing, etc. are being reproduced.

Normally, moving images are captured at a slow shutter speed by lengthening exposure time for imaging elements, so that the successive images have motion blur. The motion blur obtained by lengthening the exposure time enables capturing of smooth video as moving images. Although moving images with smooth motion can be captured at a slow shutter speed, sharp still images with less motion blur cannot be obtained when the still images are extracted from the moving images.

Conversely, still photo images are captured at a shutter speed faster than that when moving images are captured by video cameras. Thus, motion blur, such as subject blur and hand shake blur, can be suppressed by releasing the shutter at a fast speed and shortening the exposure time. Although sharp still images with less motion blur can be obtained at a fast shutter speed, unnatural moving images as if reproduced on a frame by frame basis are obtained when sill images are successively reproduced as moving images.

Accordingly, when moving images and still images are simultaneously captured, only still images with motion blur can be obtained by prioritizing smoothness in the moving images, and the smoothness in the moving images will be lost by prioritizing the image quality of the still images.

Furthermore, still images captured at a fast shutter speed, that is, images captured for shorter exposure times result in dark images with narrower dynamic ranges as a whole. Here, when gain is increased to make brighter the images captured for shorter exposure times, the images will have a smaller S/N ratio and visible noise.

The conventional capturing/recording apparatus that simultaneously captures moving images and still images captures successive images with less motion blur at a faster shutter speed. Here, the apparatus calculates a motion vector based on the relationship between previous and subsequent frames, and records the calculated motion vector together with the images. As such, the technique has been disclosed which reproduces moving images by adding motion blur to the images based on the motion vector, so that smoothness is added to the moving images, and which reproduces still images with less motion blur without performing any processing on the still images (for example, see PTL 1). FIG. 1 is a block diagram illustrating a configuration of a conventional image-capturing/recording apparatus 10 described in PTL 1.

In FIG. 1, a high speed camera 11 is a camera that captures an image at a shutter speed faster than normal cameras. The "high speed" herein is a shutter speed at which sharp still images with less subject blur can be obtained, and a shutter speed at which moving images successively reproduced result in displaying of intermittent unnatural motion.

A memory 12 stores the images captured by the high speed camera 11. The images stored in the memory 12 are transferred to an MV calculating unit 13 and a motion blur adding unit 14. The MV calculating unit 13 calculates a motion vector between the images read from the memory 12. The calculated motion vector is in transmitted to an MV coder 16.

The motion blur adding unit 14 reads video stored in the memory 12, calculates motion blur using the motion vector calculated by the MV calculating unit 13, and adds the calculated motion blur to the read video. The video to which the motion blur has been added is output to a video coding unit 15.

The video coding unit 15 codes image information to which the motion blur adding unit 14 has added the motion blur, as video information. The coded video information is output to a multiplexing unit 17. The MV coder 16 codes the motion vector calculated by the MV calculating unit 13.

The multiplexing unit 17 multiplexes the coded information. The multiplexed information is recorded by a recording unit 18.

With the configuration, the image-capturing/recording apparatus 10 captures images using a high-speed shutter, estimates a motion vector (MV), and codes and records each frame image and the motion vector. Then, the image-capturing/recording apparatus 10 obtains sharp still images with less motion blur by capturing the images using the high-speed shutter, and estimates the motion vector with high precision. The image-capturing/recording apparatus 10 records the video to which the motion blur has been added using the motion vector, together with the motion vector that has been used to add the motion blur.

Furthermore, there exists (i) a unit for obtaining a wide dynamic range image by synthesizing images captured for different exposure times with respect to an image with a small exposure amount, as images captured using the high-speed shutter, and (ii) a technique for correcting the dynamic range image according to the motion of a subject when the images are synthesized (for example, see PTL 2). FIG. 2 is a block diagram illustrating a configuration of a conventional image capturing apparatus 20 described in PTL 2.

In FIG. 2, an A/D converter 21 amplifies an analog output of imaging elements and converts it into digital data. Here, a short-time exposure image data item and a long-time exposure image data item of the same subject are captured by CCD imaging elements, and are temporarily stored in an SE memory 22 and an LE memory 23, respectively.

Next, the SE memory 22 and the LE memory 23 transmit the image data items to a CPU 29. Then, a motion estimation unit 30 estimates motion of the subject based on two image data items with different exposure amounts.

When the motion estimation unit 30 does not estimate the motion, a multiplier 24 multiplies an exposure amount ratio between a short-time exposure image and a long-time exposure image by the short-time exposure image data item read from the SE memory 22. A synthesizing circuit 25 forms a wide-dynamic-range synthesized image using the multiplied short-time exposure image data item and the long-time exposure image data item read from the LE memory 23. A compression circuit 26 synthesizes and compresses the widedynamic-range synthesized image, and outputs, the resulting image through a selector 28 controlled by the CPU 29.

When the motion is estimated, the long-time exposure image data item which is read from the LE memory 23 and in which signal processing, such as γ correction and edge enhancement, is performed by a signal processing circuit 27 is output through the selector 28.

Thereby, the wide dynamic range synthesized image is obtained when two images are captured with different exposure amounts, and the motion of the subject is corrected when the subject moves.

CITATION LIST

Patent Literature
[PTL 1] International Publication WO2007/063819
[PTL 2] Japanese Unexamined Patent Application Publication No. 2000-50151

SUMMARY OF INVENTION

Technical Problem

However, the prior art has the following problems.

First, in the configuration of PTL 1, a series of images are sequentially captured at a faster shutter speed with less blur, the motion vector is calculated based on the relationship between previous and subsequent images, and the motion vector is recorded together with the images. Then, smoothness is added to the images by adding motion blur to the images based on the motion vector during the time when the moving images are reproduced. Furthermore, the still images with less motion blur are reproduced without performing any processing.

However, capturing images at a slower shutter speed results in images with a smaller dynamic range as a whole. Furthermore, when gain is increased to make brighter the images captured at a slower shutter speed and with smaller exposure amounts, the images will have a smaller S/N ratio and visible noise. Thus, there is a problem that even when moving images and still images to which blur has been added are simultaneously obtained with respect to the images captured for shorter exposure times, only images with a narrow dynamic range or images with remaining noise are generated.

Furthermore, when images captured for different exposure times are obtained and synthesized to obtain a wide dynamic range image as in the configuration of PTL 2, as long as two images captured for different exposure times are provided, it is possible to obtain the smooth moving images and the still images in which the motion of the subject has been corrected with a wide dynamic range. However, when the two images captured for different exposure times are coded and stored, there is a problem that the coding efficiency is decreased.

The present invention solves the problems, and the object of the present invention is to provide an image capturing apparatus and a reproduction apparatus that can improve the coding efficiency, and record or reproduce a still image with a wide dynamic range and smooth moving images.

Solution to Problem

In order to solve the conventional problems, an image capturing apparatus according to an aspect of the present invention includes: an image capturing unit configured to capture an image by exposure for a first exposure time to generate a short-time exposure image, and an image by exposure for a second exposure time to generate a long-time exposure image, the second exposure time being longer than the first exposure time; a short-time exposure image storage unit configured to store the short-time exposure image generated by the image capturing unit; a long-time exposure image storage unit configured to store the long-time exposure image generated by the image capturing unit; a motion blur adding unit configured to generate a predicted image of the long-time exposure image, the predicted image being an image generated by adding motion blur to the short-time exposure image stored in the short-time exposure image storage unit; a subtracting unit configured to calculate a difference between the long-time exposure image stored in the long-time exposure image storage unit and the predicted image generated by the motion blur adding unit to generate a difference image; and a coding unit configured to code the short-time exposure image stored in the short-time exposure image storage unit and the difference image generated by the subtracting unit.

Since the short-time exposure image and the difference image are coded, the coding efficiency can be increased more than that in the case where the short-time exposure image and the long-time exposure image are coded. Furthermore, since the difference image is generated using the short-time exposure image, a corresponding decoder can reconstruct the long-time exposure image using the short-time exposure image and the difference image. Thus, smooth moving images can be reproduced using the long-time exposure image. Furthermore, a still image with a wide dynamic range can be reproduced using the short-time exposure image and the long-time exposure image.

Furthermore, the motion blur adding unit may be configured to calculate a weighted sum of a plurality of short-time exposure images including the short-time exposure image to generate the predicted image, the short-time exposure images being captured at different times and stored in the short-time exposure image storage unit.

Since the generated image includes motion blur by calculating a weighted sum of the short-time exposure images captured at different times, the predicted image similar to the long-time exposure image can be generated.

Furthermore, the motion blur adding unit may be configured to determine a weighting coefficient based on a light amount ratio of light entering when the image capturing unit captures each of the short-time exposure images and the long-time exposure image, and to calculate the weighted sum of the short-time exposure images using the determined weighting coefficient, and the coding unit may be further configured to code the weighting coefficient.

Thereby, the predicted image can be further made similar to the long-time exposure image. In other words, the difference between the generated predicted image and the long-time exposure image obtained in the capturing can be reduced, and the coding efficiency can be further improved.

Furthermore, the motion blur adding unit may be configured to determine the weighting coefficient based on a ratio between the first exposure time and the second exposure time or a ratio between average luminance of the short-time exposure images and average luminance of long-time exposure images including the long-time exposure image, the ratio corresponding to the light amount ratio, and the short-time exposure images and the long-time exposure images being generated by the image capturing unit.

Thereby, the light amount ratio can be easily determined.

Furthermore, the image capturing apparatus may further include a motion estimation unit configured to estimate a motion vector between short-time exposure images including the short-time exposure image, the short-time exposure images being captured at different times and stored in the short-time exposure image storage unit, wherein the motion blur adding unit may be configured to divide the motion vector, generate an interpolation image for interpolating between the short-time exposure images using the divided motion vector, and generate the predicted image using the generated interpolation image.

Since the interpolation image for interpolating between the short-time exposure images captured at different times is used, the predicted image more similar to the long-time exposure image can be generated, and the coding efficiency can be improved.

Furthermore, the coding unit may further be configured to code information indicating a division number of the motion vector.

Since the coding unit can adaptively determine the division number of the motion vector, the motion vector such that the difference is further reduced can be determined. Thereby, the coding efficiency can be further improved.

Furthermore, the motion blur adding unit may be configured to calculate a weighted sum of the interpolation image and the short-time exposure images to generate the predicted image.

Since the weighted sum can be calculated at shorter intervals, the predicted image more similar to the long-time exposure image can be generated, and the coding efficiency can be improved.

Furthermore, the motion blur adding unit may be configured to determine a weighting coefficient based on the motion vector, and calculate, using the determined weighting coefficient, a weighted sum of the interpolation image and the short-time exposure images stored in the short-time exposure image storage unit, and the coding unit may further be configured to code the weighting coefficient.

Since the coding unit can adaptively determine the weighting coefficient, the motion vector such that the difference is further reduced can be determined. Thereby, the coding efficiency can be further improved.

Furthermore, a reproduction apparatus according to an aspect of the present invention includes: a decoding unit configured to decode coded image data to generate a short-time exposure image and a difference image; a short-time exposure image storage unit configured to store the short-time exposure image generated by the decoding unit; a motion blur adding unit configured to generate a predicted image of a long-time exposure image, the predicted image being an image generated by adding motion blur to the short-time exposure image stored in the short-time exposure image storage unit; an adding unit configured to add the predicted image generated by the motion blur adding unit to the difference image generated by the decoding unit to generate the long-time exposure image; a long-time exposure image storage unit configured to store the long-time exposure image generated by the adding unit; and an output unit configured to output one of the short-time exposure image stored in the short-time exposure image storage unit and the long-time exposure image stored in the long-time exposure image storage unit.

Thereby, the reproduction apparatus can reconstruct the short-time exposure images and the long-time exposure image from the coded image data generated by coding the short-time exposure image and the difference image in order to improve the coding efficiency. Thus, it is possible to reproduce smooth moving images and a sharp still image with a wide dynamic range.

Furthermore, the output unit may include a motion blur eliminating unit configured to eliminate the motion blur using the long-time exposure image stored in the long-time exposure image storage unit and the short-time exposure image stored in the short-time exposure image storage unit to generate a motion-blur-free image, and the output unit may be configured to output the generated motion-blur-free image as the short-time exposure image.

Thereby, a sharp still image with a wide dynamic range can be reproduced using the short-time exposure image and the long-time exposure image.

Furthermore, the motion blur eliminating unit may be configured to synthesize (i) an image of a region having no motion in the long-time exposure image stored in the long-time exposure image storage unit and (ii) an image of a region having motion in the short-time exposure image stored in the short-time exposure image storage unit to generate the motion-blur-free image.

Thereby, a sharp still image with a wide dynamic range can be reproduced by eliminating the motion blur included in the long-time exposure image.

The present invention may be implemented not only as an image capturing apparatus or a reproduction apparatus but also as a method using the processing units included in the image capturing apparatus or the reproduction apparatus as steps. Furthermore, the present invention may be implemented as a program causing a computer to execute such steps. Furthermore, the present invention may be implemented as a computer-readable recording medium on which the program is recorded, such as a Compact Disc-Read Only Memory (CD-ROM), and as information, data, or a signal that indicates the program. Furthermore, these program, information, data, and signal may be distributed through a communication network, such as the Internet.

The part of or an entire of the constituent elements included in such an image capturing apparatus or a reproduction apparatus may be configured of a system Large Scale Integration (LSI). The System-LSI is a super-multi-function LSI manufactured by integrating constituent units on one chip, and is specifically a computer system including a microprocessor, a ROM, and a Random Access Memory (RAM).

Advantageous Effects of Invention

The present invention can improve the coding efficiency, and record or reproduce a still image with a wide dynamic range and smooth moving images.

DESCRIPTION OF EMBODIMENTS

Embodiments according to the present invention will be described with reference to drawings hereinafter.
(Embodiment 1)

An image capturing apparatus according to Embodiment 1 includes: an image capturing unit configured to capture an image by exposure for a short exposure time to generate a short-time exposure image, and an image by exposure for a long exposure time to generate a long-time exposure image; a short-time exposure image storage unit configured to store the short-time exposure image; a long-time exposure image storage unit configured to store the long-time exposure image; a motion blur adding unit configured to generate a predicted image of the long-time exposure image, the predicted image being an image generated by adding motion blur to the short-time exposure image; a subtracting unit configured to calculate a difference between the long-time exposure image and the predicted image to generate a difference image; and a coding unit configured to code the short-time exposure image and the difference image.

Figure 1:
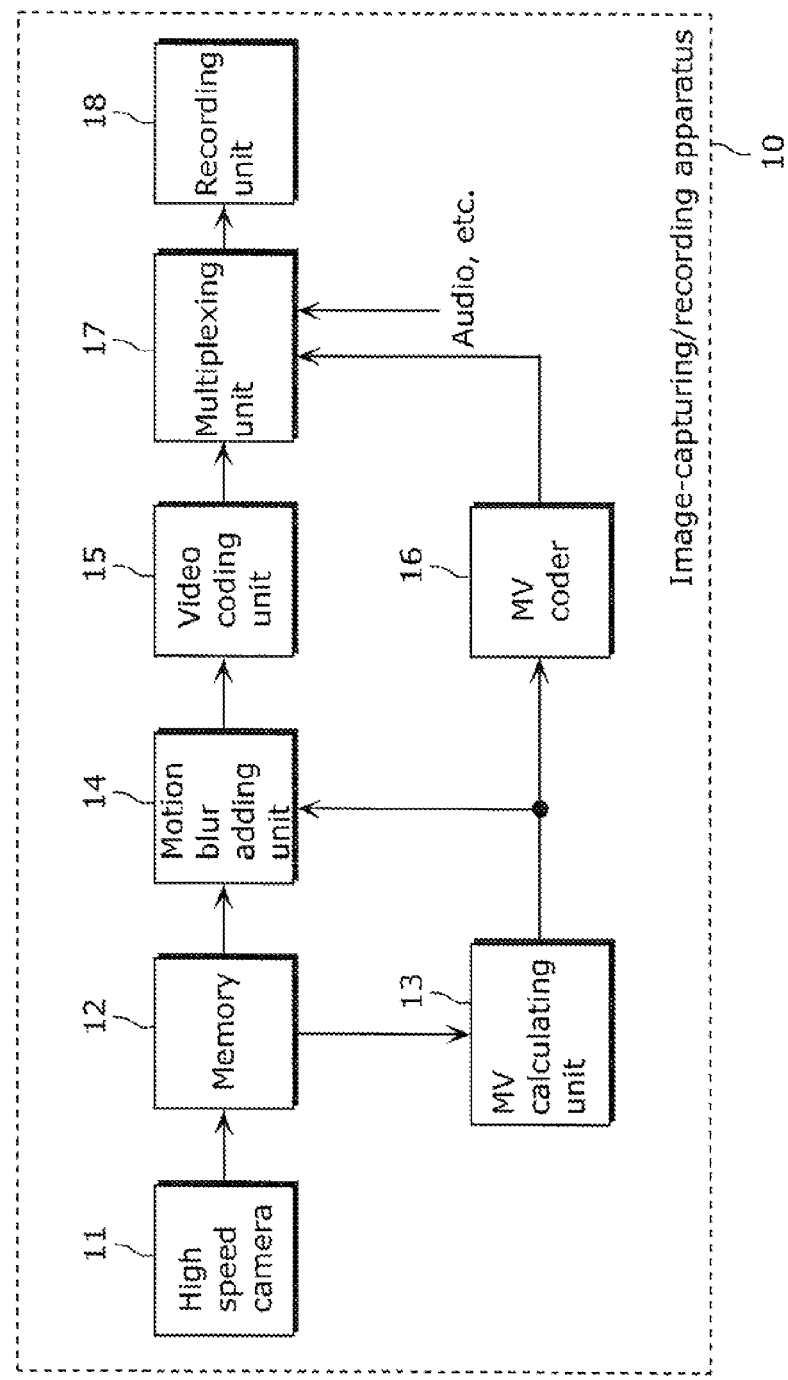
FIG. 1 is a block diagram illustrating a configuration of a conventional image-capturing/recording apparatus.
Figure 2:
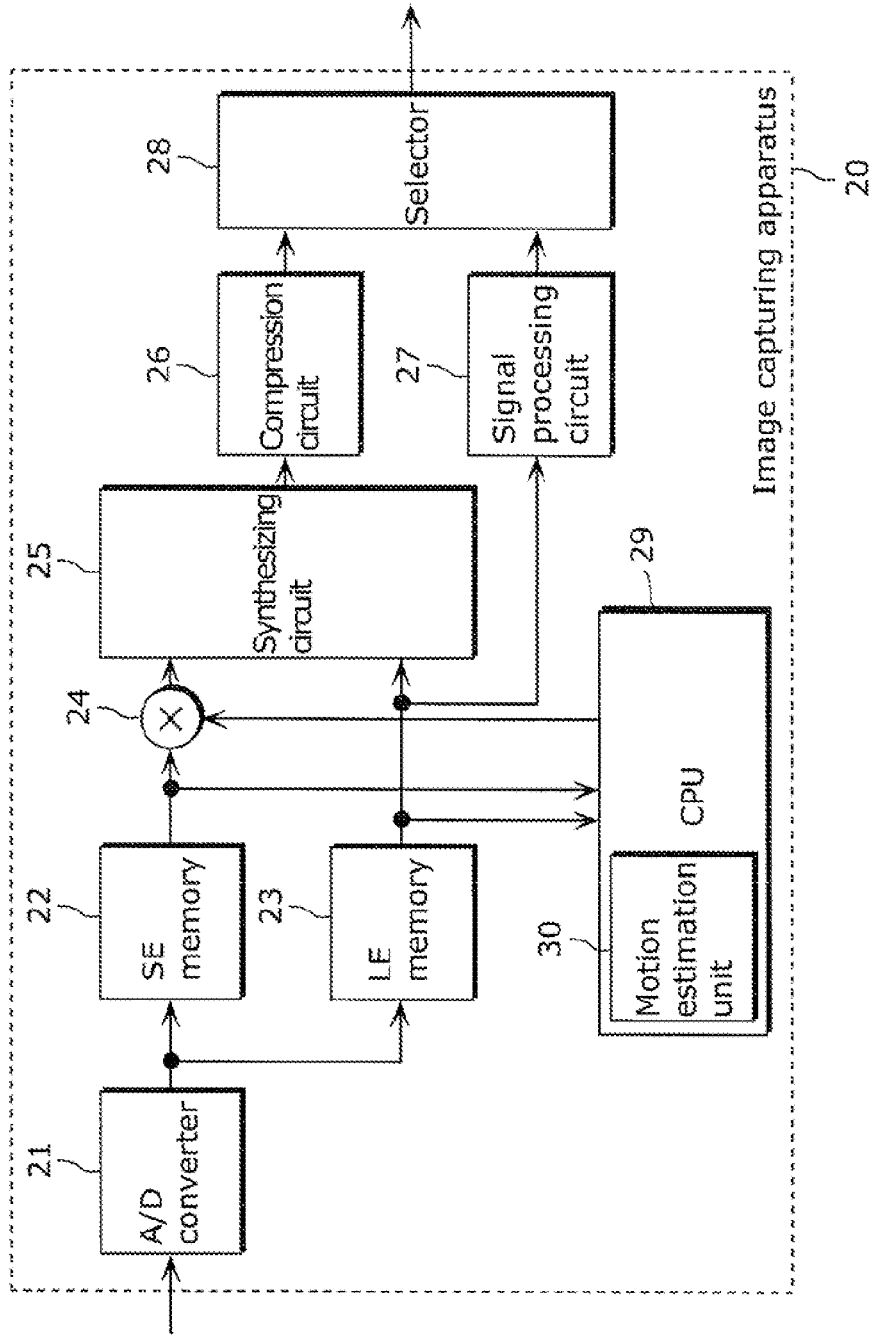
FIG. 2 is a block diagram illustrating a configuration of another conventional image capturing apparatus.
Figure 3:
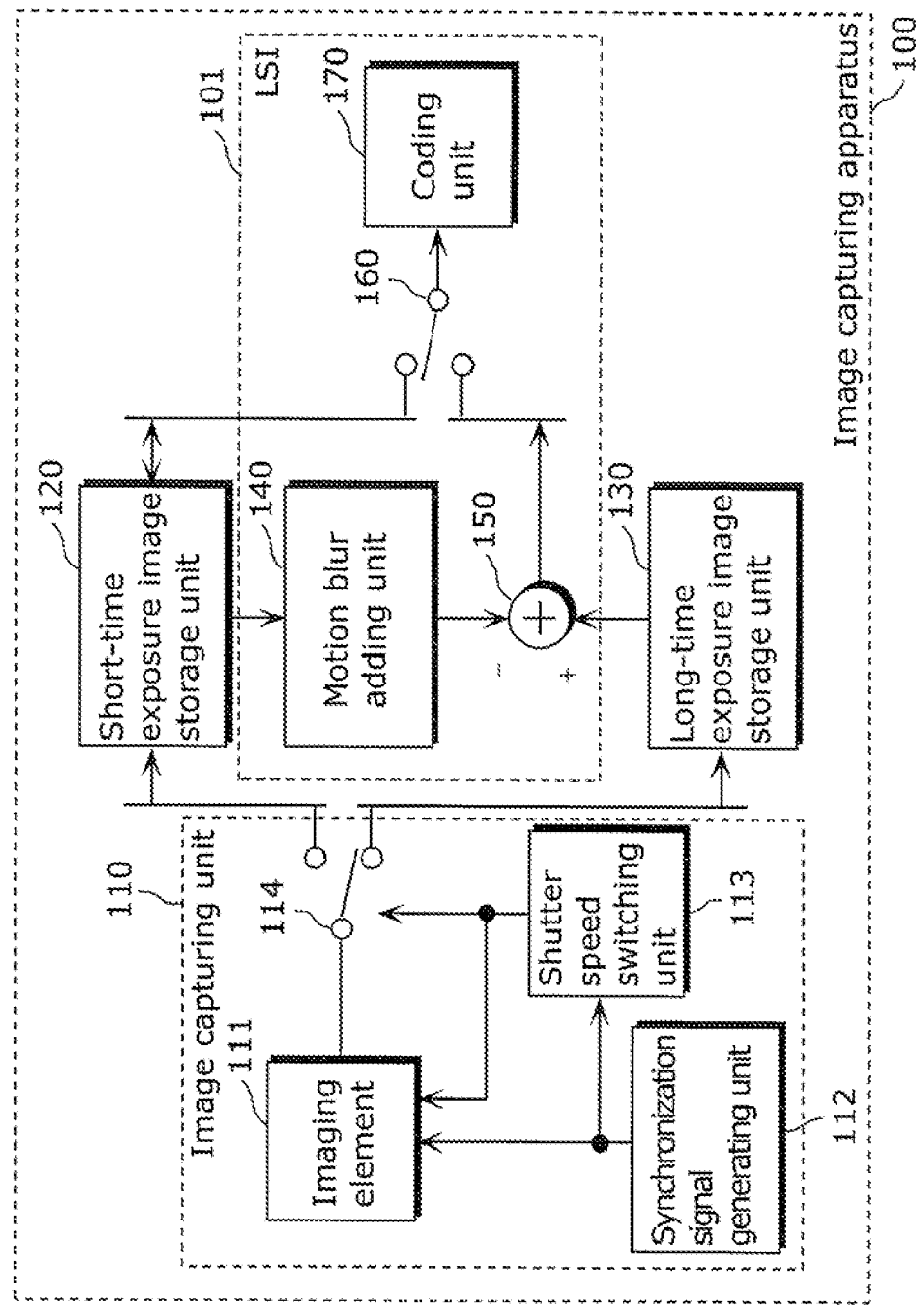
FIG. 3 is a block diagram illustrating an example of a configuration of an image capturing apparatus according to Embodiment 1 in the present invention.

FIG. 3 is a block diagram illustrating an example of a configuration of an image capturing apparatus 100 according to Embodiment 1 in the present invention. As illustrated in FIG. 3, the image capturing apparatus 100 includes an image capturing unit 110, a short-time exposure image storage unit 120, a long-time exposure image storage unit 130, a motion blur adding unit 140, a subtractor 150, a switch 160, and a coding unit 170. Here, the motion blur adding unit 140, the subtractor 150, the switch 160, and the coding unit 170 is included in an LSI 101.

The image capturing unit 110 captures an image by exposure for a first exposure time to generate a short-time exposure image, and an image by exposure for a second exposure time that is longer than the first exposure time to generate a long-time exposure image. The light exposure for the first exposure time is light exposure for a short period of time, and light exposure for the second exposure time is light exposure for a long period of time.

The first exposure time is a period of time during which a sharp still image with less motion blur can be captured, and is, for example, approximately 1/240 seconds. Furthermore, the second exposure time is a period of time during which images including motion blur can be captured and is, for example, approximately 1/60 seconds. When the images are successively reproduced, smooth moving images can be reproduced.

Here, the motion blur includes subject blur occurring when a subject moves during the exposure, and hand shake blur occurring when an image capturing apparatus moves during the exposure.

As illustrated in FIG. 3, the image capturing unit 110 includes an image capturing element 111, a synchronization signal generating unit 112, a shutter speed switching unit 113, and a switch 114.

The image capturing element 111 is an image capturing element, such as a charge coupled device (CCD) and a complementary metal oxide semiconductor (CMOS), and generates a video signal by converting light from a subject into an electrical signal. The image capturing element 111 outputs the generated video signal to one of the short-time exposure image storage unit 120 and the long-time exposure image storage unit 130, through the switch 114.

The synchronization signal generating unit 112 outputs a vertical synchronization signal to the image capturing element 111 and the shutter speed switching unit 113.

The shutter speed switching unit 113 sets a shutter speed to the image capturing element 111 based on the vertical synchronization signal generated by the synchronization signal generating unit 112 so as to set the exposure time of an image to be captured. The image capturing element 111 generates a short-time exposure image by setting a fast shutter speed. The image capturing element 111 generates a long-time exposure image by setting a slow shutter speed. Furthermore, the shutter speed switching unit 113 controls switching of the switch 114 based on the vertical synchronization signal.

More specifically, the shutter speed switching unit 113 switches between shutter speeds for each frame, based on the vertical synchronization signal. In this case, the image capturing element 111 alternately outputs short-time exposure images and long-time exposure images. The, the shutter speed switching unit 113 controls switching of the switch 114 so that the short-time exposure images are stored in the short-time exposure image storage unit 120 and the long-time exposure images are stored in the long-time exposure image storage unit 130.

The switch 114 outputs an image output from the image capturing element 111 to one of the short-time exposure image storage unit 120 and the long-time exposure image storage unit 130, based on the control by the shutter speed switching unit 113.

The short-time exposure image storage unit 120 is a memory for storing the short-time exposure images generated by the image capturing unit 110. The short-time exposure image storage unit 120 stores a signal of an image that is captured with short-time exposure at a fast shutter speed and is output from the image capturing unit 110.

The long-time exposure image storage unit 130 is a memory for storing the long-time exposure images generated by the image capturing unit 110. The long-time exposure image storage unit 130 stores a signal of an image that is captured with long-time exposure at a slow shutter speed and is output from the image capturing unit 110.

The motion blur adding unit 140 adds motion blur to an image stored in the short-time exposure image storage unit 120 to generate a predicted image of a long-time exposure image. In other words, the predicted image of the long-time exposure image is an image obtained by adding the motion blur to the short-time exposure image stored in the short-time exposure image storage unit 120 (a motion-blurred image), and is an image generated to match the long-time exposure image.

More specifically, the motion blur adding unit 140 calculates a weighted sum of short-time exposure images that are stored in the short-time exposure image storage unit 120 and captured at different times to generate the predicted image. Here, the motion blur adding unit 140 may adaptively determine a weighting coefficient to be used for calculating the weighted sum. Alternatively, the motion blur adding unit 140 may use a predetermined fixed weighting coefficient.

For example, the motion blur adding unit 140 determine a weighting coefficient based on a light amount ratio of light entering the image capturing element 111 when the image capturing unit 110 captures each of a short-time exposure image and a long-time exposure image. The light amount ratio is, for example, a ratio in light exposure between a short period of time and a long period of time, or a ratio between average luminance of short-time exposure images generated by the image capturing unit 110 and average luminance of long-time exposure images generated by the image capturing unit 110.

The subtractor 150 calculates a difference between the predicted image generated by the motion blur adding unit 140 and the long-time exposure image stored in the long-time exposure image storage unit 130 to generate a difference image.

The switch 160 selects one of the short-time exposure image read from the short-time exposure image storage unit 120 and the difference image generated by the subtractor 150, and outputs the selected image to the coding unit 170. For example, the switch 160 alternately outputs the short-time exposure images and the difference images to the coding unit 170.

The coding unit 170 codes the short-time exposure image stored in the short-time exposure image storage unit 120 and the difference image generated by the subtractor 150. Furthermore, when the motion blur adding unit 140 determines a weighting coefficient, the coding unit 170 codes the determined weighting coefficient. The coding unit 170 does not have to code motion blur adding information that is information necessary for adding motion blur, such as a weighting coefficient, when the motion blur adding in process is not adaptively changed, for example, when a weighted sum of the predetermined fixed number of short-time exposure images is calculated using a predetermined fixed weighting coefficient.

As in the configuration, the image capturing apparatus according to Embodiment 1 of the present invention codes not a short-time exposure image and a long-time exposure image as they are but a difference between the short-time exposure image and a predicted image generated using the long-time exposure image and the short-time exposure image. Thereby, the coding efficiency can be improved.

Next, an example of operations of the image capturing apparatus 100 according to Embodiment 1 will be described.

Figure 4:
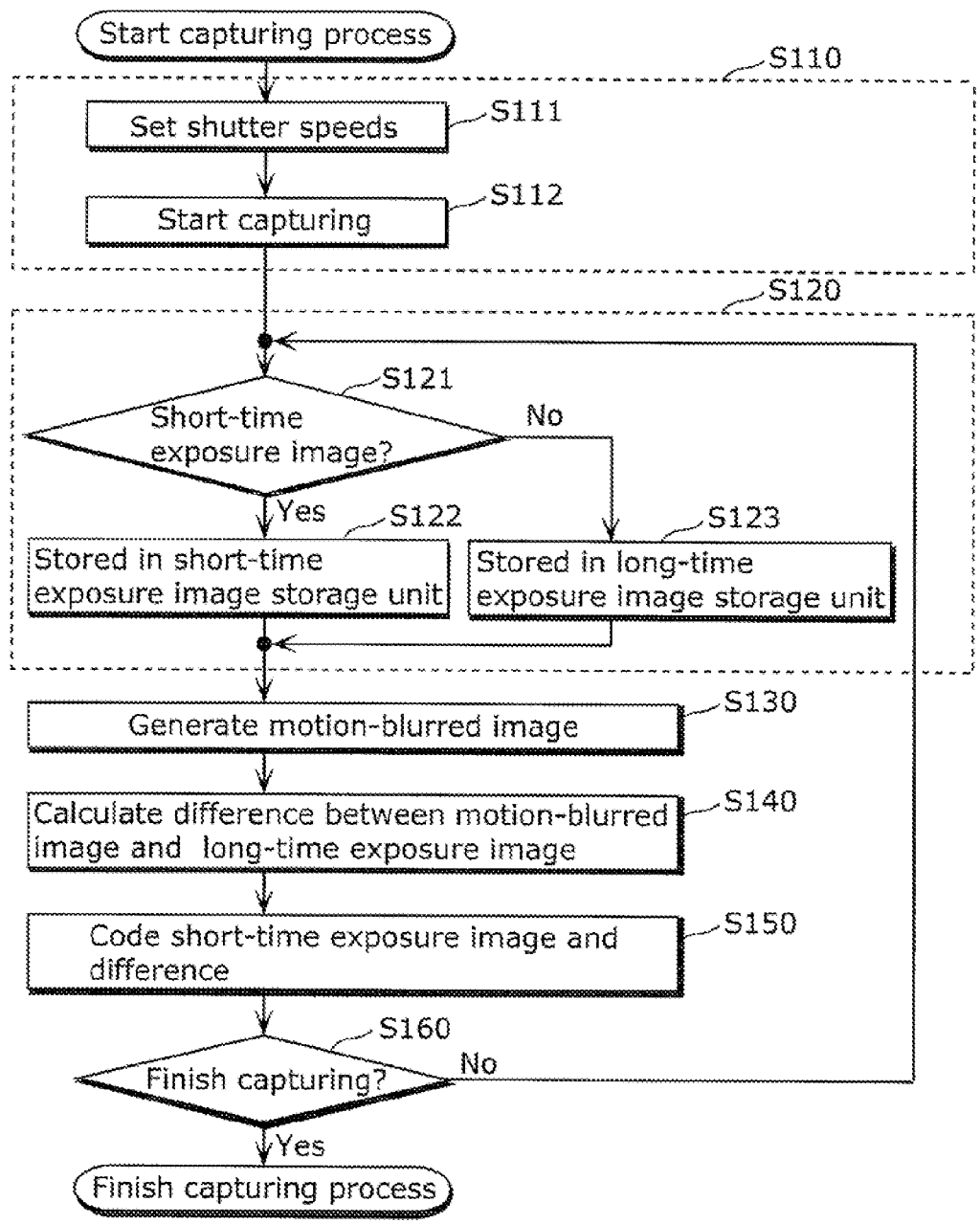
FIG. 4 is a flowchart indicating an example of operations of the image capturing apparatus according to Embodiment 1.

FIG. 4 is a flowchart indicating the example of operations of the image capturing apparatus 100 according to Embodiment 1.

First, the image capturing unit 110 captures images by exposure for short and long periods of time to generate a short-time exposure image and a long-time exposure image (S110).

More specifically, the shutter speed switching unit 113 alternately sets, to the image capturing element 111, two different shutter speeds (S111). The first shutter speed is a fast shutter speed to which a shorter exposure time is set. The second shutter speed is a slow shutter speed to which an exposure time longer than that of the first shutter speed is set.

The shutter speed switching unit 113 continues to alternately output shutter speed switching signals to the image capturing element 111 in synchronization with pulses of the vertical synchronization signal so as to enable capturing images in the two different shutter modes. Here, the image capturing element 111 captures video in synchronization with the vertical synchronization signal output from the synchronization signal generating unit 112.

In this manner, the image capturing unit 110 starts capturing images after the shutter speed switching unit 113 is in synchronization with the image capturing element 111 (S112).

When the capturing starts, it is determined whether the captured image is a short-time exposure image or a long-time exposure image (S121). More specifically, the determination is made depending on whether the shutter speed switching unit 113 sets, to the image capturing element 111, the fast shutter speed (short-time exposure) or the slow shutter speed (long-time exposure). Thus, the switch 114 switches between the short-time exposure image storage unit 120 and the long-time exposure image storage unit 130, according to the shutter speed switching signal output from the shutter speed switching unit 113.

When the image output from the image capturing element 111 is a short-time exposure image (Yes at S121), the short-time exposure image is stored in the short-time exposure image storage unit 120 (S122). Here, the switch 114 selects the short-time exposure image storage unit 120 as an output destination of the short-time exposure image, according to the shutter speed switching signal.

Furthermore, when the image output from the image capturing element 111 is a long-time exposure image (No at S121), the long-time exposure image is stored in the long-time exposure image storage unit 130 (S123). Here, the switch 114 selects the long-time exposure image storage unit 130 as an output destination of the long-time exposure image, according to the shutter speed switching signal.

As described above, the image capturing apparatus 100 sequentially stores the short-time exposure images and the long-time exposure images in the short-time exposure image storage unit 120 and the long-time exposure image storage unit 130, respectively (S120).

When a subject in a captured image has motion and there is hand shake blur in capturing the image, the motion blur adding unit 140 adds motion blur using the short-time exposure image stored in the short-time exposure image storage unit 120 (S130). The motion-blurred image is generated by calculating a weighted sum of images multiplied by a weighting coefficient, using a frame buffered in the short-time exposure image storage unit 120, as a method of adding the motion blur. The generated motion-blurred image is a predicted image of a long-time exposure image.

The subtractor 150 calculates a difference between the motion-blurred image generated by the motion blur adding unit 140 and a long-time exposure image corresponding to the motion-blurred image along the temporal axis to generate a difference image (S140).

The coding unit 170 codes the short-time exposure images and the difference image output from the subtractor 150 (S150). The switch 160 switches between the short-time exposure image and the difference image. When coding the difference image, the coding unit 170 also codes the motion blur adding information. The motion blur adding information includes the weighting coefficient used for calculating the weighted sum, the number of short-time exposure images used for the calculation, and information for identifying the short-time exposure images used for the calculation.

When capturing of images is not finished (No at S160), the processing returns to the determination on the next image (S121), and the aforementioned processes (S121 to S160) are repeated.

Figure 5:
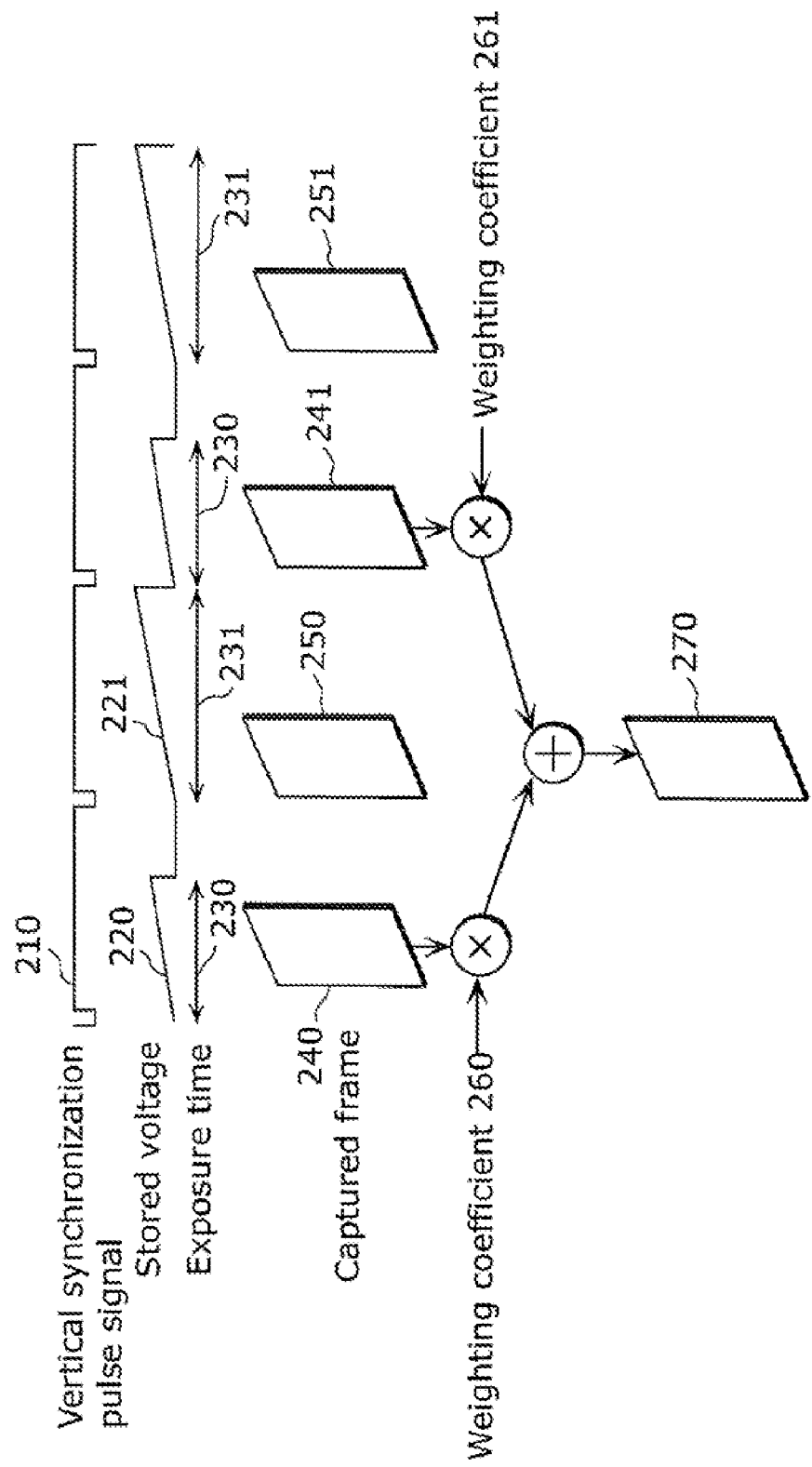
FIG. 5 illustrates an example of a motion blur adding process performed by the image capturing apparatus according to Embodiment 1.

Next, the operation performed by the motion blur adding unit 140 (S130) according to Embodiment 1 will be described with reference to FIG. 5. FIG. 5 illustrates an example of the motion blur adding process performed by the image capturing apparatus 100 according to Embodiment 1.

As illustrated in FIG. 5, the shutter speed switching unit 113 sets a shutter speed to the image capturing element 111, in synchronization with a vertical synchronization pulse signal 210 output from the synchronization signal generating unit 112. The number of pulses of the vertical synchronization pulse signal 210 corresponds to a frame rate.

The shutter speed switching unit 113 sets short exposure times 230 and long exposure times 231 according to the vertical synchronization pulse signal 210 so as to generate a short-time exposure image 240 and a long-time exposure image 250. As illustrated in FIG. 5, the image capturing element 111 alternately outputs the short-time exposure image 240 and the long-time exposure image 250.

Here, each of the exposure times 230 for which the short-time exposure images 240 and 241 have been captured is shorter than each of the exposure times 231 for which the long-time exposure images 250 and 251 have been captured. Thus, a stored voltage 220 of pixels in each of the short-time exposure images 240 and 241 is lower than a stored voltage 221 of pixels in each of the long-time as exposure images 250 and 251. This is because the stored voltage has a positive correlation with an amount of light entering the image capturing element 111. Here, it is assumed that the amount of light is kept constant during the time when each of the short-time exposure image 240 and the long-time exposure image 250 has been captured.

The motion blur adding unit 140 according to Embodiment 1 calculates a weighted sum of short-time exposure images as the motion blur adding process to generate a predicted image of a long-time exposure image, that is, a motion-blurred image. For in example, the motion blur adding unit 140 calculates a weighted sum of the short-time exposure images 240 and 241 using weighting coefficients 260 and 261 to generate a motion-blurred image 270.

The weighting coefficient to be multiplied by a short-time exposure image may be a predetermined fixed value. For example, when the short-time exposure images and the long-time exposure images are alternately generated as illustrated in FIG. 5, each of the weighting coefficients 260 and 261 to be respectively multiplied by the short-time exposure images 240 and 241 may be 0.5. As such, when the weighting coefficient is a fixed value, the coding unit 170 does not have to code the motion blur adding information indicating the weighting coefficient.

Since the stored voltages are different, an average luminance value of the short-time exposure images 240 is different from an average luminance value of the long-time exposure images 250. Thus, the motion blur adding unit 140 may adaptively determine the weighting coefficients 260 and 261 by making the motion-blurred image 270 generated by calculating the weighted sum of the short-time exposure images 240 and 241 be similar to the long-time exposure image 250 so that a difference between the motion-blurred image 270 and the long-time exposure image 250 is smaller. For example, the weighting coefficient is determined based on a ratio between the stored voltage 220 in each of the short-time exposure images and the stored voltage 221 in each of the long-time exposure images, or based on a ratio between one of the short exposure times 230 and one of the long exposure times 231.

As such, the motion blur adding unit 140 determines a weighting coefficient so that a difference between the stored voltages in the pixels due to the difference between the exposure times is smaller, and calculates a weighted sum of the short-time exposure images temporally before and after the long-time exposure image, using the determined weighting coefficient to add motion blur, such as subject blur and hand shake blur. Thereby, the motion blur adding unit 140 generates the motion-blurred image 270 as the predicted image of the long-time exposure image.

As described above, the image capturing apparatus 100 according to Embodiment 1 codes the difference image between the motion-blurred image 270 generated in the above manner and the long-time exposure image 250, so that the coding efficiency can be improved more than the case where a short-time exposure image and a long-time exposure image are separately coded. Furthermore, since the short-time exposure image is coded as it is, a sharp still image with no motion blur can be reproduced. Furthermore, since a long-time exposure image is generated using the difference image and short-time exposure images, smooth moving images can be reproduced.

Embodiment 1 describes, but not limited to, the image capturing element 111 of a single system that alternately obtains short-time exposure images and long-time exposure images. For example, image capturing units of two systems may be provided, and one of a fast shutter speed and a slow shutter speed may be assigned to each of the image capturing units.

Furthermore, although FIG. 5 exemplifies the case where a weighted sum of the two short-time exposure images 240 and 241 is calculated, a weighted sum of three or more short-time exposure images may be calculated.

Furthermore, although the short-time exposure images and the long-time exposure images on a per frame basis are alternately captured, the present invention is not limited to this. For example, short-time exposure images per frame may be captured. Alternatively, one frame of a short-time exposure image may be captured to correspond to frames of long-time exposure images, or one frame of a long-time exposure image may be captured to correspond to frames of short-time exposure images.

(Embodiment 2)

An image capturing apparatus according to Embodiment 2 of the present invention is characterized by including a motion estimation unit that estimates a motion vector between short-time exposure images captured at different times, and in that the motion blur adding unit generates an interpolation image using the estimated motion vector and adds motion blur to the short-time exposure images using the generated interpolation image.

Figure 6:
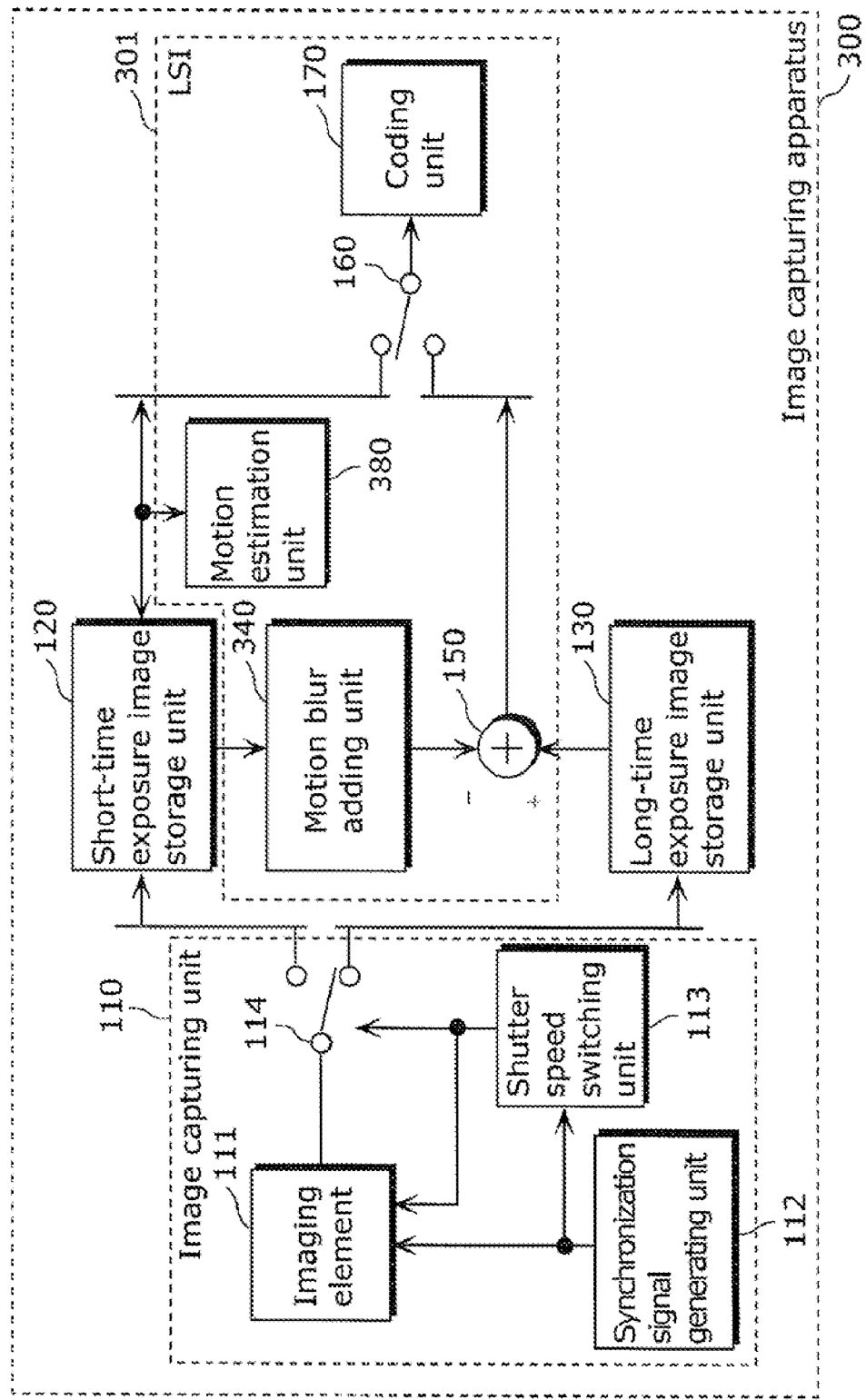
FIG. 6 is a block diagram illustrating an example of a configuration of an image capturing apparatus according to Embodiment 2 in the present invention.

FIG. 6 is a block diagram illustrating an example of a configuration of an image capturing apparatus 300 according to Embodiment 2. The image capturing apparatus 300 differs from the image capturing apparatus 100 in FIG. 3 according to Embodiment 1 by including a motion blur adding unit 340 instead of the motion blur adding unit 140 and newly including a motion estimation unit 380. Furthermore, the image capturing apparatus 300 includes an LSI 301 instead of the LSI 101. In FIG. 6, the description of the same constituent elements as those of FIG. 3 will be omitted using the same reference numerals.

The motion estimation unit 380 estimates a motion vector between previous and subsequent frames, using short-time exposure images stored in the short-time exposure image storage unit 120. The motion estimation unit 380 estimates the motion vector between frames of the short-time exposure images captured at different times, using, for example, a block matching technique.

The motion blur adding unit 340 adds motion blur (persistence) to a short-time exposure image using the motion vector estimated by the motion estimation unit 380 so that a predicted image is similar to a long-time exposure image to generate a predicted image of the long-time exposure image, that is, a motion-blurred image. More specifically, the motion blur adding unit 340 divides a motion vector, and generates one or more interpolation images using the divided motion vector. Then, the motion blur adding unit 340 calculates a weighted sum of the generated one or more interpolation images and the short-time exposure images to generate the predicted image. Here, the motion blur adding unit 340 may determine a weighting coefficient to be used for calculating the weighted sum, based on a motion vector.

Here, the coding unit 170 codes motion blur adding information, such as the division number of the motion vector and the weighting coefficient. Furthermore, the coding unit 170 may code the motion vector itself. Thereby, it is possible to reduce a computing amount by a decoder because the decoder does not have to perform the motion estimation.

The LSI 301 includes the motion blur adding unit 340, a subtractor 150, a switch 160, the coding unit 170, and the motion estimation unit 380.

Next, an example of operations of the image capturing apparatus 300 according to Embodiment 2 will be described.

Figure 7:
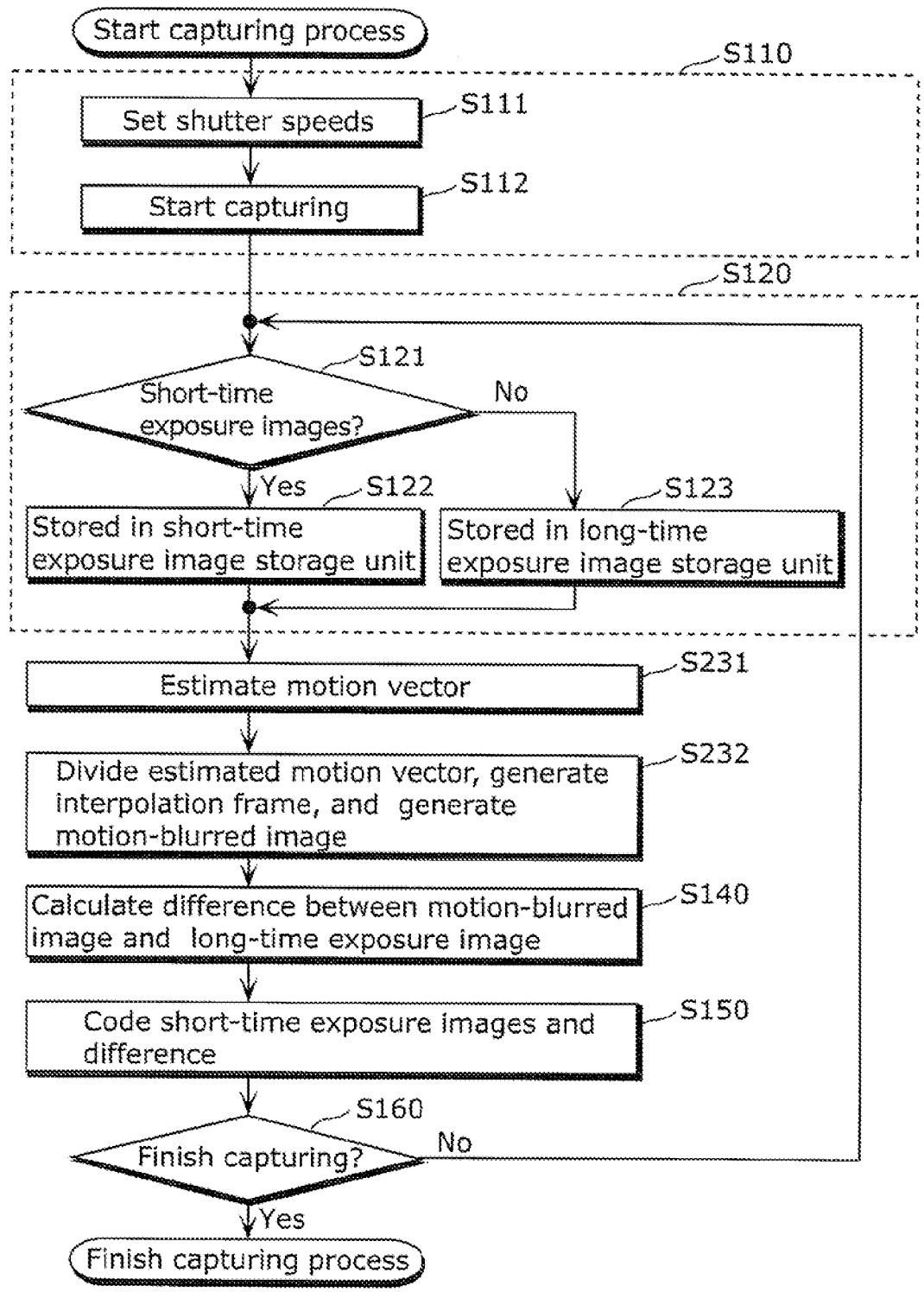
FIG. 7 is a flowchart indicating an example of operations of the image capturing apparatus according to Embodiment 2.

FIG. 7 is a flowchart indicating the example of operations of the image capturing apparatus 300 according to Embodiment 2. The same operations as those of Embodiment 1 will be indicated by the same numerals and the description thereof will be omitted.

In the same manner as Embodiment 1, the image capturing unit 110 captures short-time exposure images and a long-time exposure image (S110), the short-time exposure images are stored in the short-time exposure image storage unit 120, and the long-time exposure image is stored in the long-time exposure image storage unit 130 (S120).

The motion estimation unit 380 estimates a motion vector using in the relationship between previous and subsequent frames buffered in the short-time exposure image storage unit 120 (S231). For example, the motion estimation unit 380 estimates the motion vector for each block.

The motion blur adding unit 340 equally divides the motion vector estimated by the motion estimation unit 380, generates an interpolation frame (interpolation image) for temporally interpolating between the short-time exposure images, and calculates a weighted sum of the generated interpolation image and the short-time exposure images to generate a motion-blurred image (S232).

The subtractor 150 calculates a difference image that is a difference with the long-time exposure image and corresponds to the motion-blurred image (S140), and the coding unit 170 codes the short-time exposure images and the difference image (S150) in the same manner as Embodiment 1 (S150). Here, the coding unit 170 may also code motion blur adding information, such as a motion vector, the division number of the motion vector, and a weighting coefficient.

Figure 9:
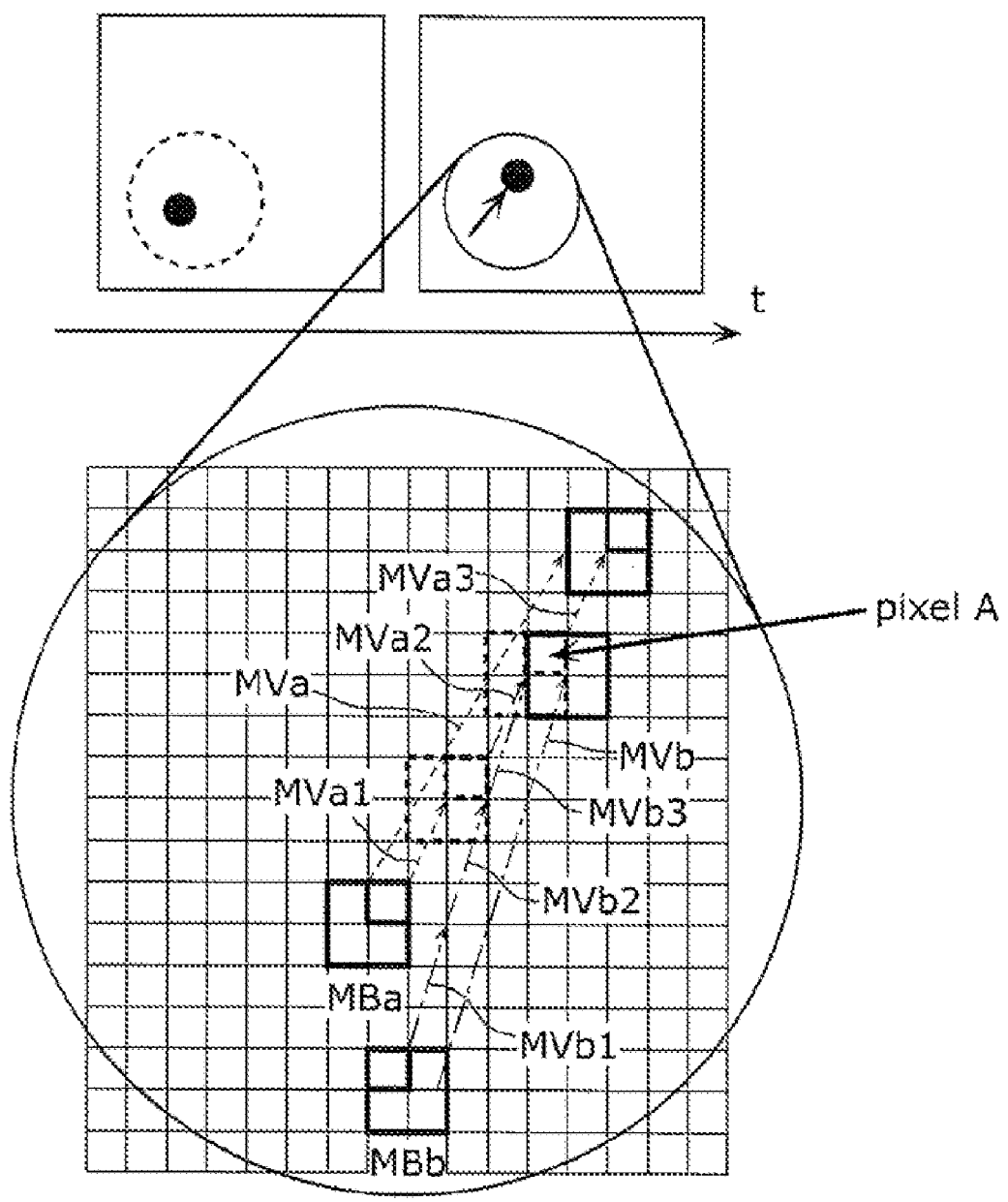
FIG. 9 illustrates an example of a motion blur adding process performed by the image capturing apparatus according to Embodiment 2.
Figure 10:
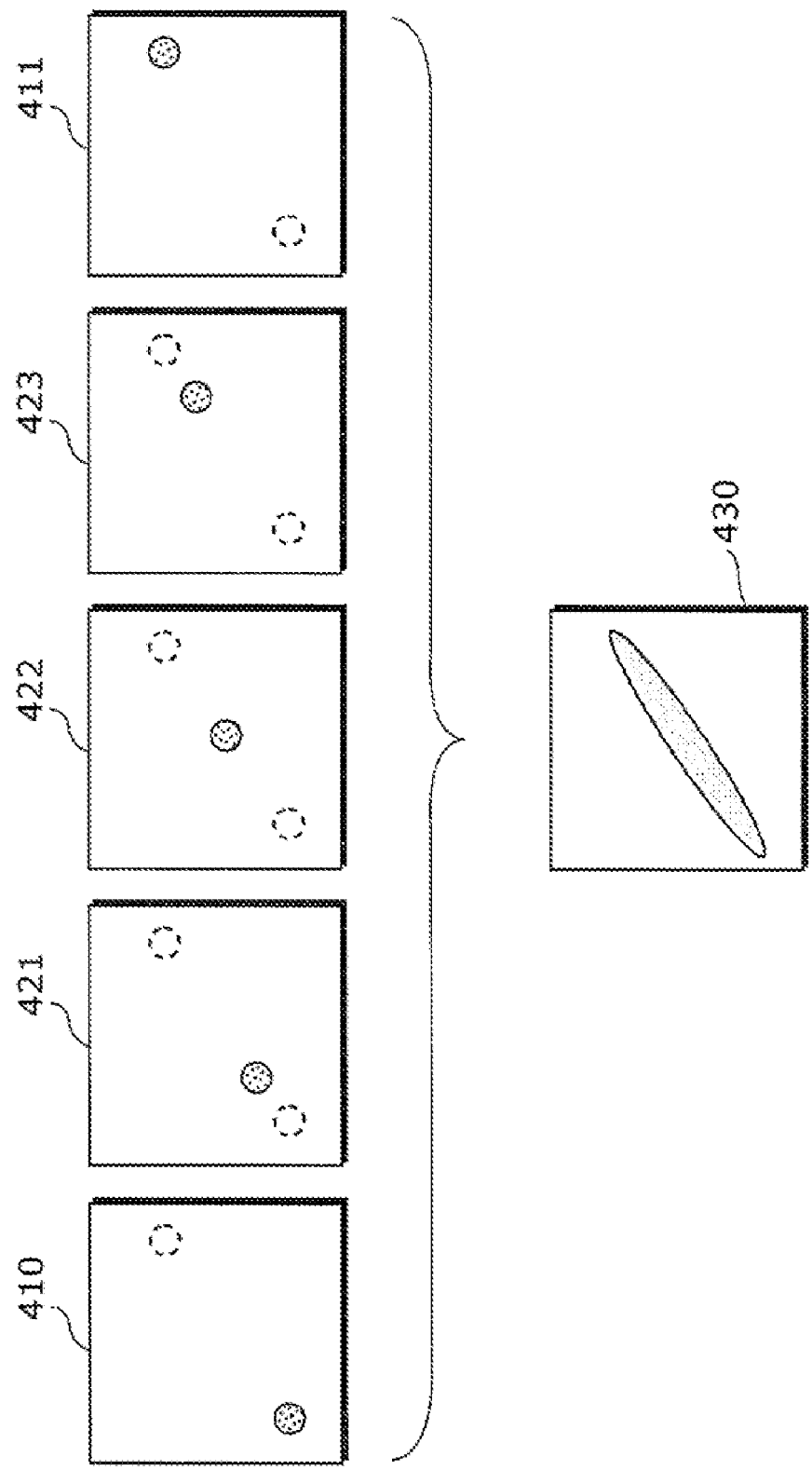
FIG. 10 illustrates an example of the motion blur adding process performed by the image capturing apparatus according to Embodiment 2.

Next, the operation performed by the motion blur adding unit 340 (S232) according to Embodiment 2 will be described in detail with reference to FIGS. 8 to 10.

Figure 8:
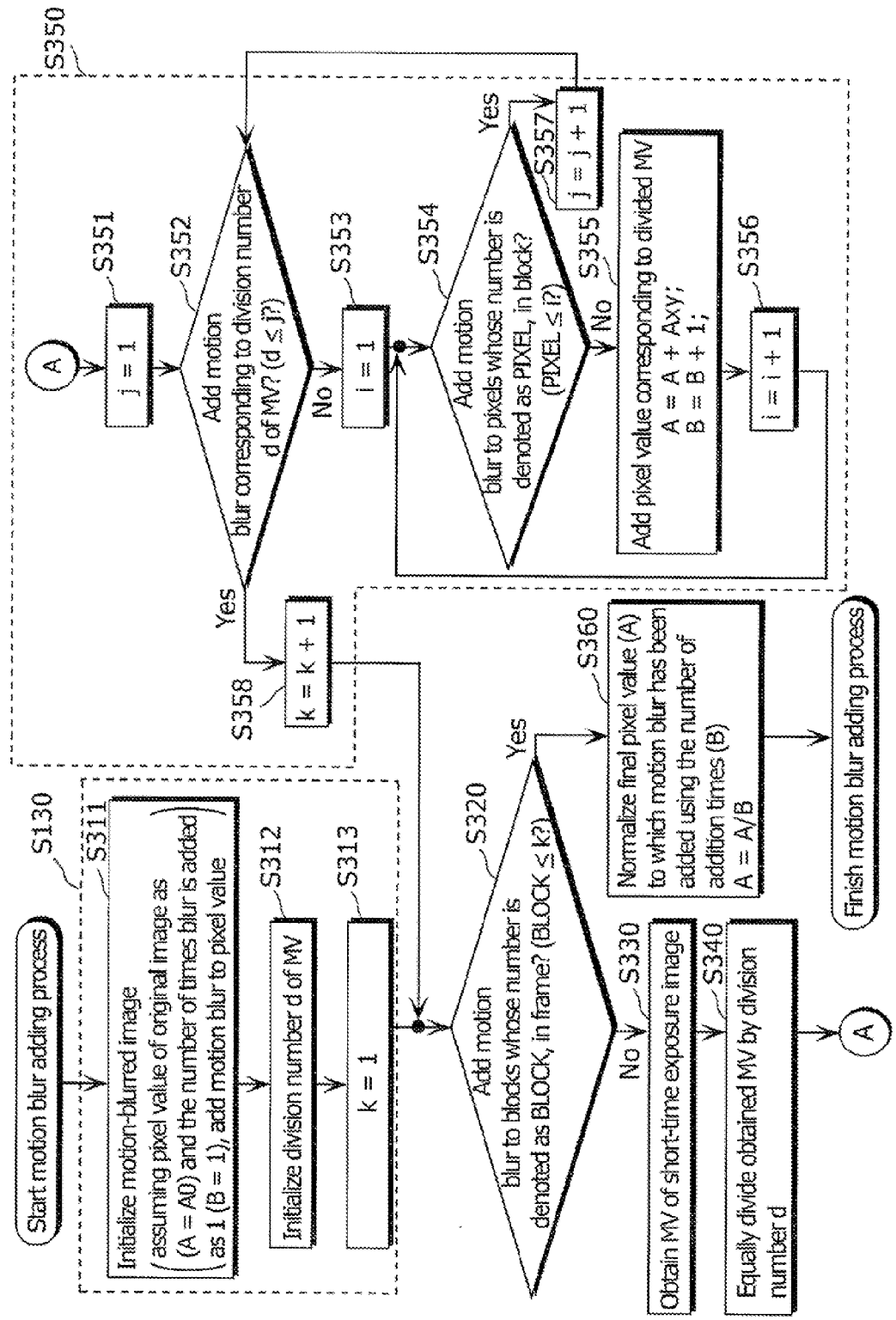
FIG. 8 is a flowchart indicating an example of a motion blur adding process performed by the image capturing apparatus according to Embodiment 2.

FIG. 8 is a flowchart indicating an example of the operation performed by the motion blur adding unit 340 according to Embodiment 2.

First, the motion blur adding unit 340 initializes a motion-blurred image (S310). More specifically, the motion blur adding unit 340 initializes the motion-blurred image using a value of a pixel in a base short-time exposure image (S311). The initialization herein is to set a pixel value A of a motion-blurred image to a pixel value A0 of a short-time exposure image to which motion blur is to be added. The number of times blur is added is one (B=1).

Furthermore, the motion blur adding unit 340 sets a division number d of a motion vector MV (S312). The division number d is a natural number equal to or larger than 2.

Furthermore, the motion blur adding unit 340 sets a parameter k for counting the number of blocks to 1 when motion blur is added to each block (S313).

Next, the motion blur adding unit 340 determines whether or not to add motion blur to blocks whose number is denoted as BLOCK, in a frame (S320). In other words, the motion blur adding unit 340 determines whether or not the parameter k indicating the number of processed blocks is equal to or larger than BLOCK, that is, whether or not a relationship of k≧BLOCK is satisfied.

When adding blur to the blocks of BLOCK has not finished (No at S320), the motion blur adding unit 340 obtains the motion vector MV of the short-time exposure images that is estimated by the motion estimation unit 380, for each block in a frame (S330).

Next, the motion blur adding unit 340 equally divides the obtained motion vector by the division number d (S340). Here, the division number d denotes—1 that is the number of interpolation images between frames of short-time exposure images. For example, each of motion vectors MVa and MVb is divided into 3, and the number of interpolation images is 2 in FIG. 9.

Next, the motion blur adding unit 340 sets a parameter j for counting the division number of a motion vector to 1 when motion blur is added to each division number (S351). Then, the motion blur adding unit 340 determines whether or not to add motion blur corresponding to the division number d of the motion vector (S352). In other words, the motion blur adding unit 340 determines whether or not the parameter j indicating the division number used for the processing is equal to or larger than the division number d of a motion vector, that is, whether or not a relationship of j≧d is satisfied.

When adding blur corresponding to the division number has not finished (No at S352), the motion blur adding unit 340 sets a parameter i for counting the number of pixels to 1 when motion blur is added to each pixel (S353). Then, the motion blur adding unit 340 determines whether or not to add motion blur to pixels whose number is denoted as PIXEL, in a block (S354). In other words, the motion blur adding unit 340 determines whether or not the parameter i indicating the number of processed pixels is equal to or larger than PIXEL, that is, whether or not a relationship of i≧PIXEL is satisfied.

When processing on the pixels of PIXEL have not finished (No at S354), the motion blur adding unit 340 adds a pixel value (S355). More specifically, the motion blur adding unit 340 adds a pixel value $A_{xy}$ indicated by the divided motion vector MV, to the pixel value A of a target pixel. Furthermore, the motion blur adding unit 340 increments the number of times B the addition is performed. Then, in order to process the next pixel, the motion blur adding unit 340 increments the parameter i (S356). The aforementioned adding processes are repeated until the execution of all the pixels included in the target block.

When the adding processes on all the pixels included in the target block have finished (Yes at S354), the motion blur adding unit 340 increments the parameter j to perform processing using the next divided motion vector (S357). Then, the adding processes on the pixels are repeated until pixel values are added for the number of times corresponding to the division number d.

When the pixel values corresponding to the division number have been added (Yes at S352), the motion blur adding unit 340 increments the parameter k to process the next block (S358). The aforementioned adding processes of pixel values are repeated until the execution of all the blocks included in a target image.

As described above, the motion blur adding unit 340 calculates a cumulative sum of pixel values per pixel included in a block, for the number of times corresponding to the division number d of the divided motion vector. Here, the motion blur adding unit 340 records the number of cumulative sum calculations B on pixel coordinates. For example, a point of a pixel A in FIG. 9 indicates pixel coordinates at which a pixel value is added to each of the divided motion vectors MVa and MVb.

Finally, when motion blur has been added to all the blocks in the frame (Yes at S320), the motion blur adding unit 340 outputs a final pixel value by normalizing the pixel value A obtained by the cumulative sum using the number of cumulative sum calculations B (S360). Here, the motion blur adding unit 340 normalizes the pixel value A by dividing the pixel value A by the number of cumulative sum calculations B.

The aforementioned processes do not have to be performed on all the pixels or blocks. For example, the processes may be performed only on a pixel or a block in which motion has been estimated. Here, the motion blur adding unit 340 has only to set the number of blocks BLOCK or the number of pixels PIXEL that is a threshold for the processes, etc. to the number of target blocks or the number of target pixels.

Hereinafter, the motion blur adding process performed by the image capturing apparatus 300 according to Embodiment 2 will be conceptually described with reference to FIG. 10. FIG. 10 conceptually illustrates an example of the motion blur adding process performed by the image capturing apparatus 300 according to Embodiment 2.

The motion estimation unit 380 estimates a motion vector using short-time exposure images 410 and 411 captured at different times. Then, the motion blur adding unit 340 divides the estimated motion in vector, and generates interpolation images 421, 422, and 423 using the divided motion vector. FIG. 10 illustrates an example in which a motion vector is divided in quarters.

Then, the motion blur adding unit 340 calculates a weighted sum of the short-time exposure images 410 and 411 and the interpolation images 421, 422, and 423 to generate a motion-blurred image 430. In the flowchart in FIG. 8, an interpolation image (consequently corresponding to the short-time exposure image 411) generated using the estimated motion vector (that is, a motion vector that is not divided) is used instead of the short-time exposure image 411.

As described above, the image capturing apparatus 300 according to Embodiment 2 includes the motion estimation unit 380 that estimates a motion vector between short-time exposure images, and divides the estimated motion vector, generates interpolation images using the divided motion vector, and calculates a weighted sum of the short-time exposure images and the interpolation images to generate a predicted image of a long-time exposure image. Thereby, compared to the image capturing apparatus 100 according to Embodiment 1, the image capturing apparatus 300 according to Embodiment 2 can generate a predicted image more similar to a long-time exposure image in order to interpolate between frames, and further improve the coding efficiency.

Since a motion vector is estimated using short-time exposure images that are originally sharp images with less blur, a leading edge clearly appears. Thus, the motion vector can be estimated with high precision. Accordingly, motion blur, such as subject blur and hand shake blur, can be added to an image in a finer particle size with higher precision, and thus, it can be expected to further reduce a difference between a long-time exposure image and a predicted image.

Finally, the difference is coded, so that the coding efficiency can be improved more than the case where a short-time exposure image and a long-time exposure image are separately coded.

Although a weighting coefficient is kept constant during the time when pixel values are cumulatively added to perform the interpolation per pixel according to Embodiment 2, the weighting coefficient may be changed according to the size of a motion vector.

Furthermore, although the motion blur adding unit 340 calculates a weighted sum of interpolation images and short-time exposure images, a predicted image of a long-time exposure image may be generated by calculating a weighted sum of interpolation images when the interpolation images are generated. For example, each ratio for dividing a motion vector that is a source of interpolation images may be handled as a weighting coefficient. Alternatively, the motion blur adding unit 340 may use a generated interpolation image as a predicted image of a long-time exposure image.

(Embodiment 3)

A reproduction apparatus according to Embodiment 3 includes: a decoding unit configured to decode coded image data to generate a short-time exposure image and a difference image; a short-time exposure image storage unit configured to store the short-time exposure image; a motion blur adding unit configured to generate a predicted image of a long-time exposure image, the predicted image being an image generated by adding motion blur to the short-time exposure image; an adding unit configured to add the predicted image to the difference image to generate the long-time exposure image; a long-time exposure image storage unit configured to store the long-time exposure image; and an output unit configured to output one of the short-time exposure image stored in the short-time exposure image storage unit and the long-time exposure image stored in the long-time exposure image storage unit. With the configuration, it is possible to reproduce smooth moving images and a sharp still image.

Figure 11:
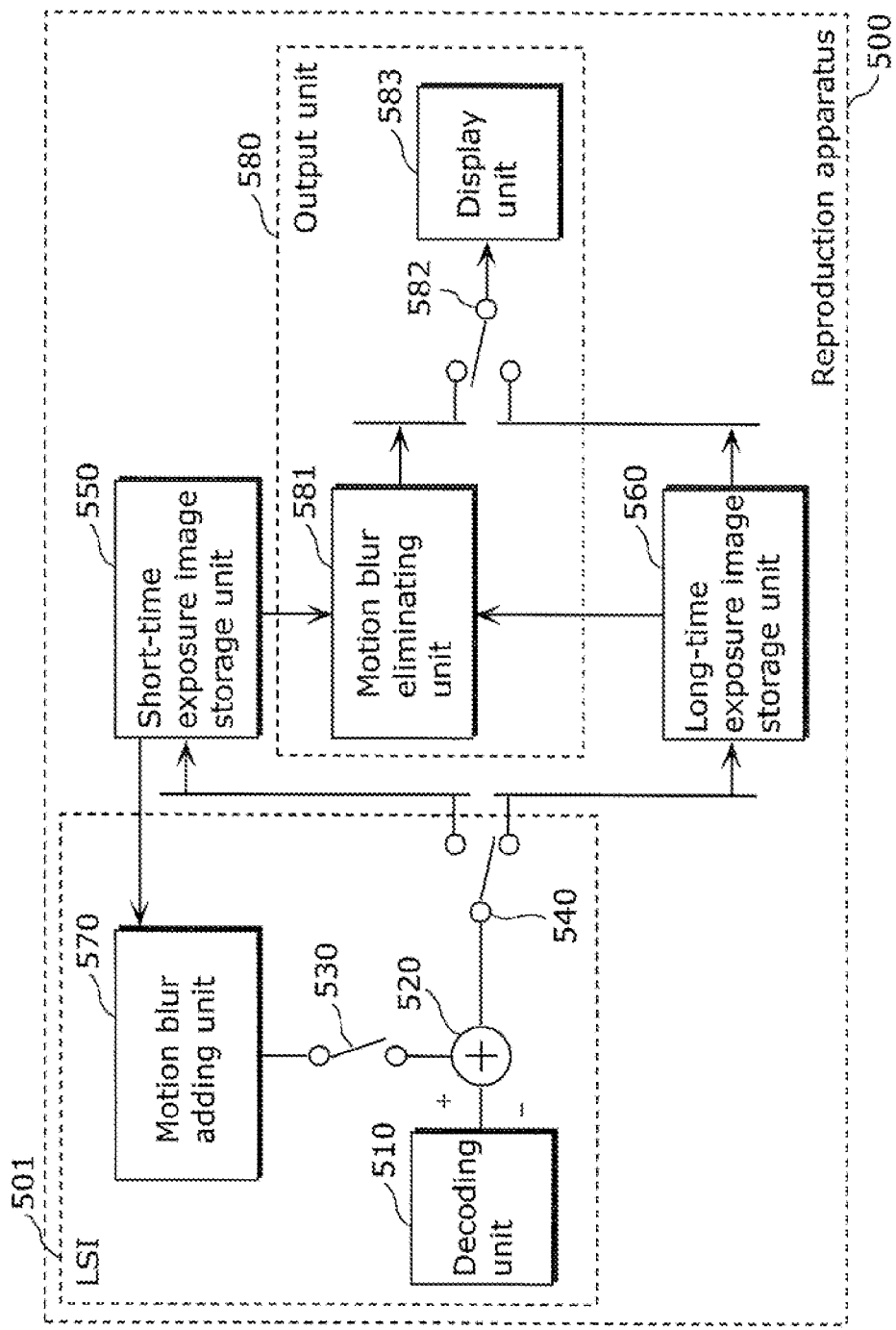
FIG. 11 is a block diagram illustrating an example of a configuration of a reproduction apparatus according to Embodiment 3 in the present invention.

FIG. 11 is a block diagram illustrating an example of a configuration of a reproduction apparatus 500 according to Embodiment 3 in the present invention. As illustrated in FIG. 11, the reproduction apparatus 500 includes a decoding unit 510, an adder 520, switches 530 and 540, a short-time exposure image storage unit 550, a long-time exposure image storage unit 560, a motion blur adding unit 570, and an output unit 580. Furthermore, the decoding unit 510, the adder 520, the switches 530 and 540, and the motion blur adding unit 570 are included in an LSI 501.

The decoding unit 510 decodes coded image data to generate a short-time exposure image and a difference image. For example, the decoding unit 510 decodes the coded image data that is data coded by the image capturing apparatus 100 in Embodiment 1 or the image capturing apparatus 300 in Embodiment 2. In other words, the coded image data is image data generated by coding (i) a short-time exposure image captured with short-time light exposure and (ii) a difference image that is a difference between a long-time exposure image captured with long-time light exposure and a predicted image of the long-time exposure image.

The adder 520 adds the predicted image generated by the motion blur adding unit 570 to the difference image generated by the decoding unit 510 to generate the long-time exposure image. More specifically, upon receipt of the difference image generated by the decoding unit 510, the adder 520 turns ON the switch 530 and adds the predicted image generated by the motion blur adding unit 570 to the difference image to generate the long-time exposure image. The long-time exposure image storage unit 560 stores the generated long-time exposure image through the switch 540.

Furthermore, upon receipt of the short-time exposure image generated by the decoding unit 510, the adder 520 turns OFF the switch 530 and stores the short-time exposure image in the short-time exposure image storage unit 550 through the switch 540 as it is (that is, after adding 0).

The switch 530 switches between ON and OFF so that the adder 520 adds the predicted image to the difference image as described above.

The switch 540 stores a short-time exposure image in the short-time exposure image storage unit 550 when the adder 520 outputs the short-time exposure image. Furthermore, the switch 540 stores a long-time exposure image in the long-time exposure image storage unit 560 when the adder 520 outputs the long-time exposure image.

The short-time exposure image storage unit 550 is a memory for storing the short-time exposure image generated by the decoding unit 510. The long-time exposure image storage unit 560 is a memory for storing the long-time exposure image generated by the adder 520.

The motion blur adding unit 570 adds motion blur to a short-time exposure image held in the short-time exposure image storage unit 550 using the short-time exposure image to generate a motion-blurred image, that is, a predicted image of a long-time exposure image. Then, the motion blur adding unit 570 adds the generated motion-blurred image to the difference image generated by the adder 520 through the switch 530.

Since the detailed processes of the motion blur adding unit 570 are the same as those according to Embodiment 1 or 2, the description thereof will be omitted hereinafter.

The output unit 580 selects one of a short-time exposure image stored in the short-time exposure image storage unit 550 and a long-time exposure image stored in the long-time exposure image storage unit 560, and outputs the selected image. As illustrated in FIG. 11, the output unit 580 includes a motion blur eliminating unit 581, a switch 582, and a display unit 583.

The motion blur eliminating unit 581 eliminates motion blur using the short-time exposure image stored in the short-time exposure image storage unit 550 and the long-time exposure image stored in the long-time exposure image storage unit 560 to generate a motion-blur-free image. More specifically, the motion blur eliminating unit 581 synthesizes the short-time exposure image and the long-time exposure image to generate a sharp still image with a wide dynamic range as the motion-blur-free image. More specifically, the motion blur eliminating unit 581 synthesizes a short-time exposure image of a region with motion and a long-time exposure image of a region without motion to generate a sharp still image with a wide dynamic range.

Here, since average luminance values of the short-time exposure image (region with motion) and the long-time exposure image (region without motion) are different from each other, the motion blur eliminating unit 581 may add, for example, a predetermined offset to a luminance value of a region with motion so that the average luminance values are the same. Alternatively, the motion blur eliminating unit 581 may synthesize a short-time exposure image and a long-time exposure image using a determined weighting coefficient so that the average luminance values are the same. Alternatively, the motion blur eliminating unit 581 may perform both the adding and the synthesizing.

The switch 582 outputs, to the display unit 583, the motion-blur-free image output from the motion blur eliminating unit 581 as a short-time exposure image, when the display unit 583 displays the short-time exposure image. Furthermore, the switch 582 outputs, to the display unit 583, the long-time exposure image output from the long-time exposure image storage unit 560, when the display unit 583 displays the long-time exposure image.

Whether the display unit 583 displays a short-time exposure image or a long-time exposure image is determined, for example, according to an instruction from the user. In other words, the switch 582 selects one of the short-time exposure image and the long-time exposure image, based on an instruction from the user.

The display unit 583 displays one of the short-time exposure image and the long-time exposure image selected by the switch 582.

With the configuration, the reproduction apparatus 500 according to the present invention outputs only long-time exposure images from the long-time exposure image storage unit 560 to the display unit 583 through the switch 582 as smooth moving images, when the reproduction apparatus 500 reproduces the moving images.

Conversely, when the reproduction apparatus 500 extracts a still image during the time when moving images are reproduced, the motion blur eliminating unit 581 obtains images having different exposure times from the short-time exposure image storage unit 550 and the long-time exposure image storage unit 560. By synthesizing the obtained short-time exposure image and long-time exposure image, the reproduction apparatus 500 can generate an image with a wide dynamic range, correct motion of a subject in an image, and output a sharp still image.

Thereby, it is possible to reproduce smooth moving images and a sharp still image with a wide dynamic range.

Next, an example of operations of the reproduction apparatus 500 according to Embodiment 3 will be described.

Figure 12:
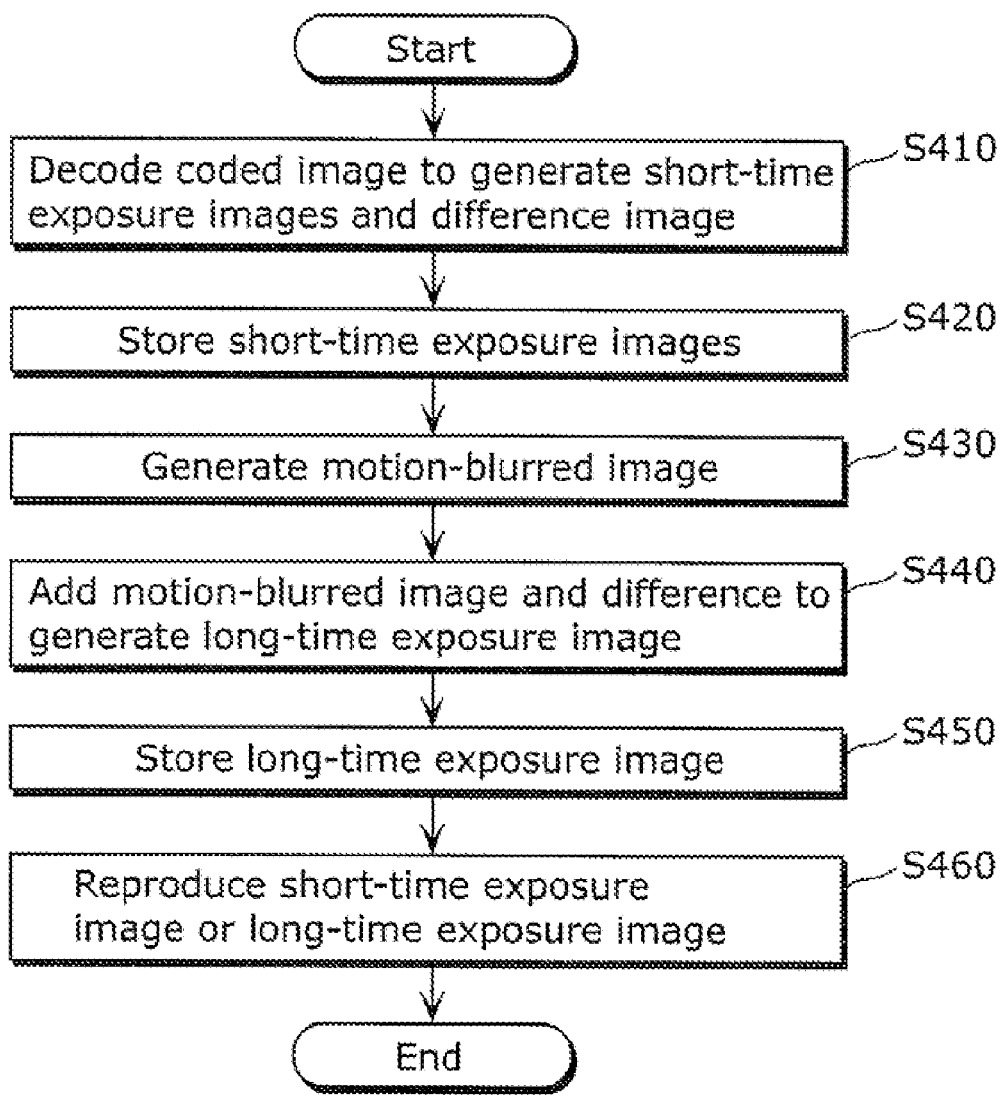
FIG. 12 is a flowchart indicating an example of operations of the reproduction apparatus according to Embodiment 3.

FIG. 12 is a flowchart indicating the example of operations of the reproduction apparatus 500 according to Embodiment 3.

First, the decoding unit 510 decodes coded image data to generate short-time exposure images and a difference image (S410). Then, the decoding unit 510 stores the generated short-time exposure images in the short-time exposure image storage unit 550 through the adder 520 and the switch 540 (S420).

Next, the motion blur adding unit 570 generates, using the short-time exposure images stored in the short-time exposure image storage unit 550, a motion-blurred image, that is, a predicted image of a long-time exposure image (S430). Then, the adder 520 adds the predicted image and the difference image to generate the long-time exposure image (S440). The adder 520 stores the generated long-time exposure image in the long-time exposure image storage unit 560 through the switch 540 (S450).

Finally, the output unit 580 reproduces the short-time exposure image stored in the short-time exposure image storage unit 550 or the long-time exposure image stored in the long-time exposure image storage unit 560, for example, according to an instruction from the user (S460).

As described above, the reproduction apparatus 500 according to Embodiment 3 can reconstruct the short-time exposure images and the long-time exposure image from the coded image data generated by coding the short-time exposure images and the difference image. Thus, it is possible to reproduce smooth moving images and a sharp still image with a wide dynamic range.

Although the image capturing apparatus, the reproduction apparatus, the image capturing method, and the reproduction method according to the present invention are described based on Embodiments, the present invention is not limited to such Embodiments. Without departing from the scope of the present invention, the present invention includes an embodiment with some modifications on Embodiments that are conceived by a person skilled in the art, and another embodiment obtained through combinations of the constituent elements of different Embodiments in the present invention.

For example, although the motion blur adding unit 140 or 340 calculates a weighted sum of short-time exposure images or a weighted sum of a short-time exposure image and an interpolation image to generate a predicted image of a long-time exposure image according to Embodiments, as long as the method is for generating an image similar to the long-time exposure image, any method may be used. For example, the motion blur adding unit 140 may generate a predicted image of a long-time exposure image by adding a predetermined offset value to each pixel value of one short-time exposure image. The offset value may be a predetermined fixed value or a value determined based on a ratio between an average luminance value of long-time exposure images and an average luminance value of short-time exposure images. The coding unit 170 codes information indicating an offset value when the offset value is not a fixed value.

Furthermore, the short-time exposure image storage unit 120 and the long-time exposure image storage unit 130 may be physically different two memories, or one memory logically divided into two.

Furthermore, the present invention may be implemented not only as an image capturing apparatus, a reproduction apparatus, an image capturing method, and a reproduction method but also as a program causing a computer to execute the image capturing method and the reproduction method according to Embodiments. Moreover, the present invention may be implemented as a computer-readable recording medium on which the program is recorded, such as a CD-ROM. Furthermore, the present invention may be implemented as information, data, or a signal that indicates the program. Furthermore, these program, information, data, and signal may be distributed through a communication network, such as the Internet.

Furthermore, the part of or an entire of the constituent elements included in such an image capturing apparatus and a reproduction apparatus may be configured of a system Large Scale Integration (LSI). The System-LSI is a super-multi-function LSI manufactured by integrating constituent units on one chip, and is specifically a computer system including a microprocessor, a ROM, and a RAM.

For example, as illustrated in FIG. 3, the LSI 101 that is an example of an integrated circuit according to the present invention includes the motion blur adding unit 140, the subtractor 150, the switch 160, and the coding unit 170. Furthermore, as illustrated in FIG. 6, the LSI 301 may include the motion blur adding unit 340, the subtractor 150, the switch 160, the coding unit 170, and the motion estimation unit 380.

Furthermore, as illustrated in FIG. 11, the LSI 501 that is another example of an integrated circuit according to the present invention includes the decoding unit 510, the adder 520, the switches 530 and 540, and the motion blur adding unit 570. Alternatively, the LSI 501 may further include the motion blur eliminating unit 581.

[Industrial Applicability]

The present invention has advantages that a still image with a wide dynamic range and smooth moving images can be recorded or reproduced without reducing the coding efficiency, and is applicable, for example, to digital cameras, digital still cameras, digital televisions, and digital recorders.

REFERENCE SIGNS LIST

10 Image-capturing/recording apparatus
11 High speed camera
12 Memory
13 MV calculating unit
14, 140, 340, 570 Motion blur adding unit
15 Video coding unit
16 MV coder
17 Multiplexing unit
18 Recording unit
20, 100, 300 Image capturing apparatus
21 A/D converter
22 SE memory
23 LE memory
24 Multiplier
25 Synthesizing circuit
26 Compression circuit
27 Signal processing circuit
28 Selector
29 CPU
30, 380 Motion estimation unit
101, 301, 501 LSI
110 Image capturing unit
111 Imaging element
112 Synchronization signal generating unit
113 Shutter speed switching unit
114, 160, 530, 540, 582 Switch
120, 550 Short-time exposure image storage unit
130, 560 Long-time exposure image storage unit
150 Subtractor
170 Coding unit
210 Vertical synchronizing pulse signal
220, 221 Stored voltage
230, 231 Exposure time
240, 241, 410, 411 Short-time exposure image
250, 251 Long-time exposure image
260, 261 Weighting coefficient
270, 430 Motion-blurred image
421, 422, 423 Interpolation image
500 Reproduction apparatus
510 Decoding unit
520 Adder
580 Output unit
581 Motion blur eliminating unit
583 Display unit

The invention claimed is:

1. An image capturing apparatus, comprising:
an image capturing unit configured to capture an image by exposure for a first exposure time to generate a short-time exposure image, and an image by exposure for a second exposure time to generate a long-time exposure image, the second exposure time being longer than the first exposure time;
a short-time exposure image storage unit configured to store the short-time exposure image generated by said image capturing unit;
a long-time exposure image storage unit configured to store the long-time exposure image generated by said image capturing unit;
a motion blur adding unit configured to generate a predicted image of the long-time exposure image, the predicted image being an image generated by adding motion blur to the short-time exposure image stored in said short-time exposure image storage unit;

a subtracting unit configured to calculate a difference between the long-time exposure image stored in said long-time exposure image storage unit and the predicted image generated by said motion blur adding unit to generate a difference image; and a coding unit configured to code the short-time exposure image stored in said short-time exposure image storage unit and the difference image generated by said subtracting unit.

2. The image capturing apparatus according to claim 1, wherein said motion blur adding unit is configured to calculate a weighted sum of a plurality of short-time exposure images including the short-time exposure image to generate the predicted image, the short-time exposure images being captured at different times and stored in said short-time exposure image storage unit.

3. The image capturing apparatus according to claim 2, wherein said motion blur adding unit is configured to determine a weighting coefficient based on a light amount ratio of light entering when said image capturing unit captures each of the short-time exposure images and the long-time exposure image, and to calculate the weighted sum of the short-time exposure images using the determined weighting coefficient, and said coding unit is further configured to code the weighting coefficient.

4. The image capturing apparatus according to claim 3, wherein said motion blur adding unit is configured to determine the weighting coefficient based on a ratio between the first exposure time and the second exposure time or a ratio between average luminance of the short-time exposure images and average luminance of long-time exposure images including the long-time exposure image, the ratio corresponding to the light amount ratio, and the short-time exposure images and the long-time exposure images being generated by said image capturing unit.

5. The image capturing apparatus according to claim 1, further comprising a motion estimation unit configured to estimate a motion vector between short-time exposure images including the short-time exposure image, the short-time exposure images being captured at different times and stored in said short-time exposure image storage unit, wherein said motion blur adding unit is configured to divide the motion vector, generate an interpolation image for interpolating between the short-time exposure images using the divided motion vector, and generate the predicted image using the generated interpolation image.

6. The image capturing apparatus according to claim 5, wherein said coding unit is further configured to code information indicating a division number of the motion vector.

7. The image capturing apparatus according to claim 5, wherein said motion blur adding unit is configured to calculate a weighted sum of the interpolation image and the short-time exposure images to generate the predicted image.

8. The image capturing apparatus according to claim 7, wherein said motion blur adding unit is configured to determine a weighting coefficient based on the motion vector, and calculate, using the determined weighting coefficient, a weighted sum of the interpolation image and the short-time exposure images stored in said short-time exposure image storage unit, and said coding unit is further configured to code the weighting coefficient.

9. A reproduction apparatus, comprising:

a decoding unit configured to decode coded image data to generate a short-time exposure image and a difference image;

a short-time exposure image storage unit configured to store the short-time exposure image generated by said decoding unit;

a motion blur adding unit configured to generate a predicted image of a long-time exposure image, the predicted image being an image generated by adding motion blur to the short-time exposure image stored in said short-time exposure image storage unit;

an adding unit configured to add the predicted image generated by said motion blur adding unit to the difference image generated by said decoding unit to generate the long-time exposure image;

a long-time exposure image storage unit configured to store the long-time exposure image generated by said adding unit; and an output unit configured to output one of the short-time exposure image stored in said short-time exposure image storage unit and the long-time exposure image stored in said longtime exposure image storage unit.

10. The reproduction apparatus according to claim 9, wherein said output unit includes a motion blur eliminating unit configured to eliminate the motion blur using the long-time exposure image stored in said long-time exposure image storage unit and the short-time exposure image stored in said short-time exposure image storage unit to generate a motion-blur-free image, and said output unit is configured to output the generated motion-blur-free image as the short-time exposure image.

11. The reproduction apparatus according to claim 10, wherein said motion blur eliminating unit is configured to synthesize (i) an image of a region having no motion in the long-time exposure image stored in said long-time exposure image storage unit and (ii) an image of a region having motion in the short-time exposure image stored in said short-time exposure image storage unit to generate the motion-blur-free image.

12. An image capturing method, comprising:

capturing an image by exposure for a first exposure time to generate a short-time exposure image, and an image by exposure for a second exposure time to generate a long-time exposure image, the second exposure time being longer than the first exposure time;

storing, in a memory, the short-time exposure image and the long-time exposure image generated in said capturing;

generating a predicted image of the long-time exposure image, the predicted image being an image generated by adding motion blur to the short-time exposure image stored in the memory;

calculating a difference between the long-time exposure image stored in the memory and the predicted image generated in said generating to generate a difference image; and coding the short-time exposure image stored in the memory and the difference image generated in said calculating.

13. A reproduction method, comprising:
decoding coded image data to generate a short-time exposure image and a difference image;
storing, in a short-time exposure image storage unit, the short-time exposure image generated in said decoding;
generating a predicted image of a long-time exposure image, the predicted image being an image generated by adding motion blur to the short-time exposure image stored in the short-time exposure image storage unit;
adding the predicted image generated in said generating to the difference image generated in said decoding to generate the long-time exposure image;
storing, in a long-time exposure image storage unit, the long-time exposure image generated in said adding; and
outputting one of the short-time exposure image stored in the short-time exposure image storage unit and the long-time exposure image stored in the long-time exposure image storage unit.

14. An integrated circuit, comprising:
a motion blur adding unit configured to generate a predicted image of a long-time exposure image, the predicted image being an image generated by adding motion blur to a short-time exposure image, the long-time exposure image being generated by capturing an image by exposure for a second exposure time, the short-time exposure image being generated by capturing an image by exposure for a first exposure time, and the second exposure time being longer than the first exposure time;
a subtracting unit configured to calculate a difference between the long-time exposure image and the predicted image generated by said motion blur adding unit to generate a difference image; and
a coding unit configured to code the short-time exposure image and the difference image generated by said subtracting unit.

15. An integrated circuit, comprising:
a decoding unit configured to decode coded image data to generate a short-time exposure image and a difference image;
a motion blur adding unit configured to generate a predicted image of a long-time exposure image, the predicted image being an image generated by adding motion blur to the short-time exposure image generated by said decoding unit;
an adding unit configured to add the predicted image generated by said motion blur adding unit to the difference image generated by said decoding unit to generate the long-time exposure image; and
an output unit configured to output one of the short-time exposure image generated by said decoding unit and the long-time exposure image generated by said adding unit.

16. A non-transitory computer-readable recording medium on which a program causing a computer to execute an image capturing method is recorded, the image capturing method including:
capturing an image by exposure for a first exposure time to generate a short-time exposure image, and an image by exposure for a second exposure time to generate a long-time exposure image, the second exposure time being longer than the first exposure time;
storing, in a memory, the short-time exposure image and the long-time exposure image generated in said capturing;
generating a predicted image of the long-time exposure image, the predicted image being an image generated by adding motion blur to the short-time exposure image stored in the memory;
calculating a difference between the long-time exposure image stored in the memory and the predicted image generated in said generating to generate a difference image; and
coding the short-time exposure image stored in the memory and the difference image generated in said calculating.

17. A non-transitory computer-readable recording medium on which a program causing a computer to execute a reproduction method is recorded, the reproduction method including:
decoding coded image data to generate a short-time exposure image and a difference image;
storing, in a short-time exposure image storage unit, the short-time exposure image generated in said decoding;
generating a predicted image of a long-time exposure image, the predicted image being an image generated by adding motion blur to the short-time exposure image stored in the short-time exposure image storage unit;
adding the predicted image generated in said generating to the difference image generated in said decoding to generate the long-time exposure image;
storing, in a long-time exposure image storage unit, the long-time exposure image generated in said adding; and
outputting one of the short-time exposure image stored in the short-time exposure image storage unit and the long-time exposure image stored in the long-time exposure image storage unit.

* * * * *